(12) United States Patent
Lee et al.

(10) Patent No.: US 11,178,543 B2
(45) Date of Patent: Nov. 16, 2021

(54) APPARATUS AND METHOD FOR MOBILITY PROCEDURE INVOLVING MOBILITY MANAGEMENT ENTITY RELOCATION

(71) Applicant: QUALCOMM Incorporated, San Diego, CA (US)

(72) Inventors: Soo Bum Lee, San Diego, CA (US); Adrian Edward Escott, Reading (GB); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/591,419

(22) Filed: Oct. 2, 2019

(65) Prior Publication Data
US 2020/0037155 A1    Jan. 30, 2020

Related U.S. Application Data

(62) Division of application No. 15/787,575, filed on Oct. 18, 2017, now Pat. No. 10,462,656, which is a
(Continued)

(51) Int. Cl.
*H04W 12/037* (2021.01)
*H04W 36/00* (2009.01)
*H04W 12/043* (2021.01)

(52) U.S. Cl.
CPC ....... *H04W 12/037* (2021.01); *H04W 12/043* (2021.01); *H04W 36/0055* (2013.01); *H04W 36/0038* (2013.01)

(58) Field of Classification Search
CPC ............................. H04W 12/06; H04W 12/04
(Continued)

(56) References Cited

U.S. PATENT DOCUMENTS 7,764,948 B2   7/2010  Lee et al.
8,638,936 B2   1/2014  Suh et al.
(Continued)

FOREIGN PATENT DOCUMENTS

CN   101378591 A   3/2009
CN   101516089 A   8/2009
(Continued)

OTHER PUBLICATIONS

International Search Report and Written Opinion—PCT/US2016/047101—ISA/EPO—dated Nov. 8, 2016.
(Continued)

*Primary Examiner* — Kiet M Doan
(74) *Attorney, Agent, or Firm* — Loza & Loza LLP

(57) ABSTRACT

A device that identifies entry into a new service area, transmits a service area update request to a network device associated with a network, receives a control plane message from the network indicating control plane device relocation or a key refresh due to a service area change in response to transmitting the service area update request, and derives a first key based in part on data included in the control plane message and a second key shared between the device and a key management device. Another device that receives a handover command from a network device associated with a network, the handover command indicating a new service area, derives a first key based on data included in the handover command and on a second key shared between the device and a key management device, and sends a handover confirmation message that is secured based on the first key.

24 Claims, 19 Drawing Sheets

Related U.S. Application Data division of application No. 15/089,396, filed on Apr. 1, 2016, now Pat. No. 9,883,385.

(60) Provisional application No. 62/218,863, filed on Sep. 15, 2015.

(58) Field of Classification Search
USPC .............. 370/331, 329; 455/411, 435.1, 438; 380/270, 272
See application file for complete search history.

(56) References Cited

U.S. PATENT DOCUMENTS

| | | | |
|---|---|---|---|
| 8,688,115 | B2 | 4/2014 | Mildh et al. |
| 9,071,962 | B2 | 6/2015 | Janakiraman et al. |
| 9,883,385 | B2 | 1/2018 | Lee et al. |
| 2007/0060127 | A1* | 3/2007 | Forsberg ............... H04W 12/04 455/436 |
| 2008/0095362 | A1 | 4/2008 | Blom et al. |
| 2008/0181411 | A1 | 7/2008 | Norrman et al. |
| 2010/0046467 | A1* | 2/2010 | Chiou ............ H04W 12/04033 370/331 |
| 2010/0061340 | A1 | 3/2010 | Ramle et al. |
| 2010/0064135 | A1 | 3/2010 | Thakare et al. |
| 2010/0205442 | A1* | 8/2010 | Han ................ H04W 12/04031 713/171 |
| 2011/0021216 | A1 | 1/2011 | Pudney et al. |
| 2011/0292913 | A1* | 12/2011 | Wu ........................ H04W 12/06 370/331 |
| 2011/0311053 | A1 | 12/2011 | Escott et al. |
| 2012/0047551 | A1 | 2/2012 | Pattar et al. |
| 2012/0184284 | A1 | 7/2012 | Moisio et al. |
| 2013/0185561 | A1 | 7/2013 | Brusilovsky et al. |
| 2013/0196631 | A1 | 8/2013 | Vanderveen et al. |
| 2014/0365777 | A1* | 12/2014 | Cha ........................ H04L 9/0819 713/171 |
| 2015/0208240 | A1 | 7/2015 | Yang et al. |
| 2015/0223058 | A1* | 8/2015 | Yang ................. H04W 12/0401 455/411 |
| 2015/0257052 | A1 | 9/2015 | Schliwa-Bertling et al. |
| 2015/0319652 | A1* | 11/2015 | Liu ....................... H04L 9/0869 455/410 |
| 2016/0164875 | A1* | 6/2016 | Zhang ................... H04W 12/08 726/4 |
| 2017/0251357 | A1* | 8/2017 | Iwai ....................... H04W 40/02 |
| 2018/0063707 | A1 | 3/2018 | Lee et al. |

FOREIGN PATENT DOCUMENTS

| | | |
|---|---|---|
| CN | 101523797 A | 9/2009 |
| CN | 101610147 A | 12/2009 |
| CN | 101860862 A | 10/2010 |
| CN | 102484817 A | 5/2012 |
| CN | 104661217 A | 5/2015 |
| EP | 2315371 A2 | 4/2011 |
| WO | WO-2011052995 A2 | 5/2011 |

OTHER PUBLICATIONS

Song M., et al., "Reduction of Authentication Cost based on Key Caching for Inter-MME Handover Support," International Conference on High Performance Computing & Simulation (HPCS), 2014, pp. 885-892.

Zumerie D., "3GPP LTE Security Aspects", 3GPP Workshop, Bangalore, May 30, 2011, May 30, 2011 (May 30, 2011), pp. 1-27, XP055089219, Retrieved from the Internet: URL: http://www.3g4g.co.uk/Lte/LTE_Security_Pres_1105_3GPP.pdf [retrieved on Nov. 19, 2013].

Taiwan Search Report—TW105125950—TIPO—dated Mar. 10, 2020.

Taiwan Search Report—TW109115810—TIPO—dated Jun. 30, 2020.

Pope M., et al., (3GPP): "3rd Generation Partnership Project, Technical Specification Group Services and System Aspects, 3GPP System Architecture Evolution (SAE), Security Architecture, (Release 8)", 3GPP TS 33.401, V2.0.0 (May 2008), May 16, 2008, 45 Pages.

Zhang D., (3GPP): "3rd Generation Partnership Project, Technical Specification Group Services and System Aspects, Rationale and Track of Security Decisions in Long Term Evolved (LTE) RAN/ 3GPP System Architecture Evolution (SAE) (Release 8)", 3GPP TR 33.821, V2.0.0 (Mar. 2009), Mar. 1, 2009, 137 Pages.

* cited by examiner

APPARATUS AND METHOD FOR MOBILITY PROCEDURE INVOLVING MOBILITY MANAGEMENT ENTITY RELOCATION

CLAIM OF PRIORITY

The present application for patent is a divisional application of U.S. application Ser. No. 15/787,575 entitled "Apparatus and Method for Mobility Procedure Involving Mobility Management Entity Relocation" filed Oct. 18, 2017, now U.S. Pat. No. 10,462,656, issued on Oct. 29, 2019, which in turn was a divisional application of U.S. application Ser. No. 15/089,396 entitled "Apparatus and Method for Mobility Procedure Involving Mobility Management Entity Relocation" filed Apr. 1, 2016, now U.S. Pat. No. 9,883,385, issued on Jan. 30, 2018, which in turn claims priority to provisional application Ser. No. 62/218,863 entitled "Apparatus and Method for Mobility Procedure Involving Mobility Management Entity Relocation" filed Sep. 15, 2015, the entire disclosures of which are hereby expressly incorporated by reference.

BACKGROUND

Field

The present disclosure relates generally to apparatuses and methods for improved mobility procedures involving mobility management entity (MME) relocation.

Background

A current cellular network architecture, shown in FIG. 1, uses a mobility management entity (MME) 110 to implement procedures for controlling access to the cellular network by a user equipment (UE) 120. Typically, the MME is owned and operated by a network service provider (system operator) as a core network element, and is located in a secure location controlled by the network service provider. The core network 100 has a control plane including a Home Subscriber Server (HSS) 130 and the MME, and a user plane including a Packet Data Network (PDN) Gateway (PGW) 140 and a Serving Gateway (SGW) 150. The MME is connected to an evolved Node B (eNodeB) 160. The eNodeB provides radio interfaces, RRC 180 and PDCP/RLC 190, with the UE.

In future cellular network architectures it is envisioned that the MMEs 110 or network components that perform many of the functions of the MMEs 110 will be pushed out towards the network edge where they are less secure either because they are physically more accessible and/or are not isolated from other network operators. As network functions are moved to, for example, the cloud (e.g., internet), it may not be assumed that they are secure because they may have a lower level of physical isolation, or no physical isolation. Further, network equipment may not be owned by a single network service provider. As an example, multiple MME instances may be hosted with a single physical hardware device. As a result, the keys sent to the MMEs may need refreshing more frequently and hence it may not be advisable to forward the authentication vectors (AVs) to the MMEs.

There is a need for improved apparatuses and methods that provide additional security for the cellular network architectures of the future where MME functions are performed close to the network edge.

SUMMARY

One feature provides a device (e.g., user device) that comprises a wireless communication interface adapted to transmit and receive data wirelessly to and from a network, and a processing circuit communicatively coupled to the wireless communication interface. The processing circuit may be adapted to identify entry into a new service area, transmit a service area update request to a network device associated with the network, receive a control plane message from the network indicating control plane device relocation or a key refresh due to a service area change in response to transmitting the service area update request, and derive a first key based in part on data included in the control plane message received and a second key shared between the device and a key management device, the key management device associated with the network. According to one aspect, the control plane message is received from a target control plane device due to the service area change, the target control plane device being a different control plane device from one currently serving the device. According to another aspect, the data included in the control plane message includes a control plane device identifier that identifies a control plane device that is and/or will be serving the device.

According to one aspect, deriving the first key is further based in part on a counter value Key Count maintained at the key management device and included in the control plane message. According to another aspect, the processing circuit is further adapted to derive at least one of an evolved node B (eNB) key $K_{eNB}$, a non-access stratum key $K_{NAS}$, and/or a next hop (NH) key based on the first key to secure communications between the device and the network. According to yet another aspect, the new service area is at least one of a new tracking area and/or a new routing area, and the service area update request is associated with at least one of a tracking area update and/or a routing area update.

According to one aspect, the control plane message is a security mode command, the target control plane device is a target mobility management entity (MME), the key management device is a session key management function (SKMF) device, and the second key is a session root key for an authentication session. According to another aspect, a control plane device maintains a mobility management context and a session management context for the device, and the key management device maintains the second key.

Another feature provides a device comprising a wireless communication interface adapted to transmit and receive data wirelessly to a network, and a processing circuit communicatively coupled to the wireless communication interface. The processing circuit is adapted to receive a handover command from a network device associated with the network, the handover command indicating a new service area, derive a first key based on data included in the handover command and on a second key shared between the device and a key management device, the key management device associated with the network, and send a handover confirmation message that is secured based on the first key. According to one aspect, the handover command includes a target control plane device identifier associated with a target control plane device serving a target radio access node that is and/or will be serving the device. According to another aspect, deriving the first key is based in part on the target control plane device identifier.

According to one aspect, the target control plane device is a target mobility management entity (MME), the key management device is a session key management function (SKMF) device, and the target control plane device identifier is an MME identifier associated with the target MME.

According to another aspect, deriving the first key is further based in part on a counter value Key Count maintained at the key management device. According to yet another aspect, the second key is a session root key for an authentication session.

Another feature provides a network device associated with a network, the network device comprising a communication interface adapted to transmit and receive information, and a processing circuit communicatively coupled to the communication interface. The processing circuit is adapted to receive a service area update request from a device for which the network device does not have a device context or the device has changed service areas, transmit a request for a first key to a key management device, receive the first key from the key management device, the first key based in part on a second key shared between the key management device and the device, and transmit a control plane message to the device that includes data allowing the device to derive the first key. According to one aspect, the network device is a mobility management entity (MME) and the first key is further based on an MME identifier that identifies the MME. According to another aspect, the processing circuit is further adapted to transmit a device context request to a prior control plane device that previously served the device if the network device does not have the device context, and receive the device context from the prior control plane device in response to transmitting the device context request.

According to one aspect, the data includes a control plane device identifier that identifies the network device. According to another aspect, the processing circuit is further adapted to receive a counter value Key Count from the key management device along with the first key, and include the counter value Key Count in the data transmitted to the device. According to yet another aspect, the processing circuit is further adapted to transmit a service area update to the device after receiving notification from the device that the control plane message was successfully received.

According to one aspect, the service area update request is associated with at least one of a tracking area update and/or a routing area update and changing service areas includes at least one of changing tracking areas and/or changing routing areas. According to another aspect, the control plane message is a non-access stratum security mode command, the key management device is a session key management function (SKMF) device, the device is a user equipment, the device context is a user equipment context associated with the user equipment, and the second key is a session root key for an authentication session.

Another feature provides a network device associated with a network, the network device comprising a communication interface adapted to transmit and receive information, and a processing circuit communicatively coupled to the communication interface. The processing circuit adapted to receive a forward relocation request at the network device from a source control plane device, transmit a request for a first key to a key management device, receive the first key from the key management device, the first key based in part on a second key shared between the key management device and a device, and transmit a handover request to a target radio access node (RAN) with a RAN session key derived from the first key. According to one aspect, the processing circuit is further adapted to receive a handover request acknowledgement message from the target RAN indicating the target RAN will serve the device. According to another aspect, the processing circuit is further adapted to transmit an acknowledgement message to the key management device indicating receipt of the first key only after receiving the handover request acknowledgement message from the target RAN.

According to one aspect, the processing circuit is further adapted to transmit a forward relocation response to the source control plane device that includes data utilized by the device to derive the first key. According to another aspect, the network device is a target control plane device that will serve the device and the data includes a target control plane device identifier that identifies the target control plane device. According to yet another aspect, the target control plane device is a target mobility management entity (MME), the source control plane device is a source MME, the target control plane device identifier is a globally unique MME identifier (GUMMEI), the key management device is a session key management function (SKMF) device, and the device is a user equipment.

According to one aspect, the data includes a counter value Key Count maintained at the key management device. According to another aspect, the processing circuit adapted to receive the first key from the key management device is further adapted to receive a counter value Key Count along with the first key.

Another feature provides a method operational at a device for performing tracking area updates involving mobility management entity (MME) relocation or a change of tracking area, the method comprising identifying entry into a new tracking area, transmitting a tracking area update (TAU) request to a network device associated with a wireless communication network, receiving a security mode command from the network device indicating MME relocation or a key refresh due to a change of tracking area in response to transmitting the TAU request, and deriving a first key $K_{ASME}$ based in part on data included in the security mode command received. According to one aspect, the security mode command is sent by an MME to refresh the first key $K_{ASME}$. According to another aspect, the security mode command is sent by a target MME due to tracking area change.

According to one aspect, the data included in the security mode command includes an MME identifier. According to another aspect, the MME identifier is a globally unique MME identifier (GUMMEI). According to yet another aspect, deriving the first key $K_{ASME}$ is based in part on the GUMMEI.

According to one aspect, deriving the first key $K_{ASME}$ is further based in part on a second key $K_{SKMF}$ shared between the device and a session key management function (SKMF) device. According to another aspect, deriving the first key $K_{ASME}$ is further based in part on a counter value Key Count maintained at the SKMF device. According to yet another aspect, the data included in the security mode command further includes the counter value Key Count.

According to one aspect, the method further comprises receiving a tracking area update message from the network device. According to another aspect, the method further comprises decrypting the tracking area update message using one or more keys derived from the first key $K_{ASME}$. According to yet another aspect, the tracking area update message includes a new globally unique temporary identifier (GUTI).

Another feature provides a device comprising a wireless communication interface adapted to transmit and receive data wirelessly with a network device associated with a wireless communication network, and a processing circuit communicatively coupled to the wireless communication interface, the processing circuit adapted to identify entry into a new tracking area, transmit a tracking area update (TAU) request to the network device associated with the wireless communication network, receive a security mode command from the network device indicating mobility management entity (MME) relocation or a key refresh due to a change of tracking area in response to transmitting the TAU request, and derive a first key $K_{ASME}$ based in part on data included in the security mode command received.

Another feature provides a device comprising means for identifying entry into a new tracking area, means for transmitting a tracking area update (TAU) request to a network device associated with a wireless communication network, means for receiving a security mode command from the network device indicating mobility management entity (MME) relocation or a key refresh due to a change of tracking area in response to transmitting the TAU request, and means for deriving a first key $K_{ASME}$ based in part on data included in the security mode command received.

Another feature provides a non-transitory computer-readable storage medium having instructions for performing tracking area updates involving mobility management entity (MME) relocation or a change of tracking area stored thereon, the instructions when executed by at least one processor causes the processor to identify entry into a new tracking area, transmit a tracking area update (TAU) request to a network device associated with a wireless communication network, receive a security mode command from the network device indicating MME relocation or a key refresh due to a change of tracking area in response to transmitting the TAU request, and derive a first key $K_{ASME}$ based in part on data included in the security mode command received.

Another feature provides a method operational at a device for performing handover involving mobility management entity (MME) relocation or a change of tracking area, the method comprising receiving a handover command from a network device indicating a new tracking area, deriving a first key $K_{ASME}$ based on data included in the handover command, and sending a handover confirmation message secured based on the first key $K_{ASME}$. According to one aspect, the method further comprises verifying the handover command before deriving the first key $K_{ASME}$. According to another aspect, the handover command includes a target MME identifier associated with a target MME serving the network device.

According to one aspect, deriving the first key $K_{ASME}$ is based in part on the target MME identifier. According to another aspect, the target MME identifier is a globally unique MME identifier (GUMMEI) associated with the target MME serving the network device. According to yet another aspect, deriving the first key $K_{ASME}$ is further based in part on a second key $K_{SKMF}$ shared between the device and a session key management function (SKMF) device serving the target MME.

According to one aspect, deriving the first key $K_{ASME}$ is further based in part on a counter value Key Count maintained at the SKMF device. According to another aspect, the data included in the handover command further includes the counter value Key Count.

Another feature provides a device comprising a wireless communication interface adapted to transmit and receive data wirelessly with a network device associated with a wireless communication network, and a processing circuit communicatively coupled to the wireless communication interface, the processing circuit adapted to receive a handover command from the network device indicating a new tracking area, derive a first key $K_{ASME}$ based on data included in the handover command, and send a handover confirmation message secured based on the first key $K_{ASME}$.

Another feature provides a device comprising means for receiving a handover command from a network device indicating a new tracking area, means for deriving a first key $K_{ASME}$ based on data included in the handover command, and means for sending a handover confirmation message secured based on the first key $K_{ASME}$.

Another feature provides a non-transitory computer-readable storage medium having instructions for performing handover involving mobility management entity (MME) relocation or a change of tracking area stored thereon, the instruction when executed by at least one processor causes the processor to receive a handover command from a network device indicating a new tracking area, derive a first key $K_{ASME}$ based on data included in the handover command, and send a handover confirmation message secured based on the first key $K_{ASME}$.

Another feature provides a method for performing a tracking area update involving mobility management entity (MME) relocation or a change of tracking area at the MME, the method comprising receiving a tracking area update (TAU) request from a user equipment (UE) for which the MME does not have a UE context associated with the UE or for which the UE has changed tracking areas, transmitting a request for a first key $K_{ASME}$ to a session key management function (SKMF) device, receiving the first key $K_{ASME}$ from the SKMF device, and transmitting a non-access stratum (NAS) security mode command (SMC) to the UE that includes data allowing the UE to derive the first key $K_{ASME}$. According to one aspect, the method further comprises transmitting a UE context request to a source MME that previously served the UE if the MME does not have the UE context. According to another aspect, the method further comprises receiving the UE context from the source MME in response to transmitting the UE context request. According to yet another aspect, the method further comprises transmitting a key acknowledgment to the SKMF device after receiving the first key $K_{ASME}$.

According to one aspect, the data includes an MME identifier that identifies the MME. According to another aspect, the MME identifier is a globally unique MME identifier (GUMMEI). According to yet another aspect, the data includes a counter value Key Count maintained at the SKMF device.

According to one aspect, receiving the first key $K_{ASME}$ from the SKMF device further includes receiving a counter value Key Count from the SKMF device. According to another aspect, the method further comprises transmitting a tracking area update to the UE after receiving notification from the UE that NAS SMC is successfully completed. According to yet another aspect, the method further comprises transmitting an encrypted tracking area update to the UE concurrently with the NAS SMC. According to another aspect, transmitting the request for the first key $K_{ASME}$ includes transmitting a UE location update.

Another feature provides a network device associated with a wireless communication network, the network device comprising a communication interface adapted to transmit and receive information, and a processing circuit communicatively coupled to the communication interface, the processing circuit adapted to receive a tracking area update (TAU) request from a user equipment (UE) for which the network device does not have a UE context associated with the UE or for which the UE has changed tracking areas, transmit a request for a first key $K_{ASME}$ to a session key management function (SKMF) device, receive the first key $K_{ASME}$ from the SKMF device, and transmit a non-access stratum (NAS) security mode command (SMC) to the UE that includes data allowing the UE to derive the first key $K_{ASME}$.

Another feature provides a network device associated with a wireless communication network, the network device comprising means for receiving a tracking area update (TAU) request from a user equipment (UE) for which the network device does not have a UE context associated with the UE or for which the UE has changed tracking areas, means for transmitting a request for a first key $K_{ASME}$ to a session key management function (SKMF) device, means for receiving the first key $K_{ASME}$ from the SKMF device, and means for transmitting a non-access stratum (NAS) security mode command (SMC) to the UE that includes data allowing the UE to derive the first key $K_{ASME}$.

Another feature provides a non-transitory computer-readable storage medium having instructions for performing a tracking area update involving mobility management entity (MME) relocation or a change of tracking area at the MME stored thereon, the instructions when executed by at least one processor causes the processor to receive a tracking area update (TAU) request from a user equipment (UE) for which the MME does not have a UE context associated with the UE or for which the UE has changed tracking areas, transmit a request for a first key $K_{ASME}$ to a session key management function (SKMF) device, receive the first key $K_{ASME}$ from the SKMF device, and transmit a non-access stratum (NAS) security mode command (SMC) to the UE that includes data allowing the UE to derive the first key $K_{ASME}$.

Another feature provides a method for performing handover involving mobility management entity (MME) relocation or a change of tracking area at the MME, the method comprising receiving a forward relocation request at a target MME from a source MME, transmitting a request for a first key $K_{ASME}$ to a session key management function (SKMF) device, receiving the first key $K_{ASME}$ from the SKMF device, and transmitting a handover request to a target radio access node (RAN) with a key $K_{eNB}$ derived from the first key $K_{ASME}$. According to one aspect, the method further comprises receiving a handover request acknowledgement message from the target RAN indicating the target RAN will serve a user equipment (UE). According to another aspect, the method further comprises transmitting an acknowledgement message to the SKMF indicating receipt of the first key $K_{ASME}$ only after receiving the handover request acknowledgement message from the target RAN.

According to one aspect, the method further comprises transmitting a forward relocation response to the source MME that includes data utilized by a UE to derive the first key $K_{ASME}$. According to another aspect, the data includes an MME identifier that identifies the target MME. According to yet another aspect, the MME identifier is a globally unique MME identifier (GUMMEI).

According to one aspect, the data includes a counter value Key Count maintained at the SKMF device. According to another aspect, receiving the first key $K_{ASME}$ from the SKMF device further includes receiving a counter value Key Count from the SKMF device.

Another feature provides a network device comprising a communication interface adapted to transmit and receive information, and a processing circuit communicatively coupled to the communication interface, the processing circuit adapted to receive a forward relocation request at the network device from a source mobility management entity (MME), transmit a request for a first key $K_{ASME}$ to a session key management function (SKMF) device, receive the first key $K_{ASME}$ from the SKMF device, and transmit a handover request to a target radio access node (RAN) with a key $K_{eNB}$ derived from the first key $K_{ASME}$.

Another feature provides a network device associated with a wireless communication network, the network device comprising means for receiving a forward relocation request at the network device from a source mobility management entity (MME), means for transmitting a requesting for a first key $K_{ASME}$ to a session key management function (SKMF) device, means for receiving the first key $K_{ASME}$ from the SKMF device, and means for transmitting a handover request to a target radio access node (RAN) with a key $K_{eNB}$ derived from the first key $K_{ASME}$.

Another feature provides a non-transitory computer-readable storage medium having instructions for performing handover involving mobility management entity (MME) relocation or a change of tracking area at the MME stored thereon, the instructions when executed by at least one processor causes the processor to receive a forward relocation request at the network device from a source MME, transmit a requesting for a first key $K_{ASME}$ to a session key management function (SKMF) device, receive the first key K-ASME from the SKMF device, and transmit a handover request to a target radio access node (RAN) with a key $K_{eNB}$ derived from the first key $K_{ASME}$.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
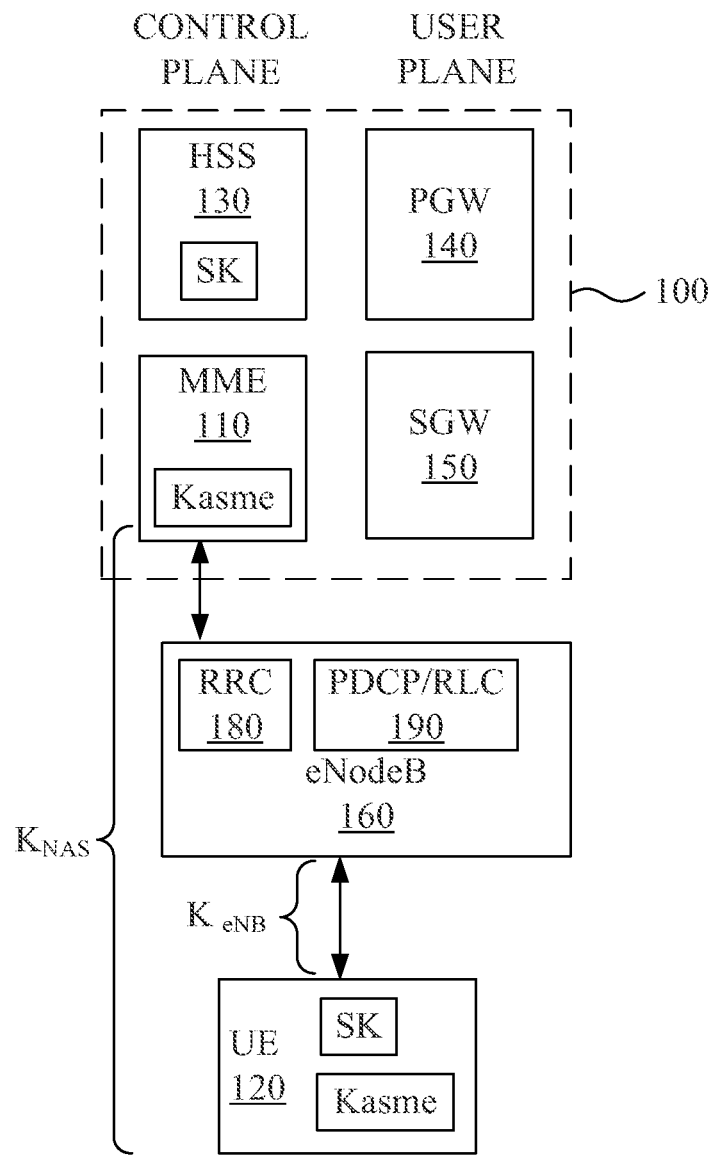
FIG. 1 is a block diagram of an example of a wireless communication system found in the prior art.
Figure 2:
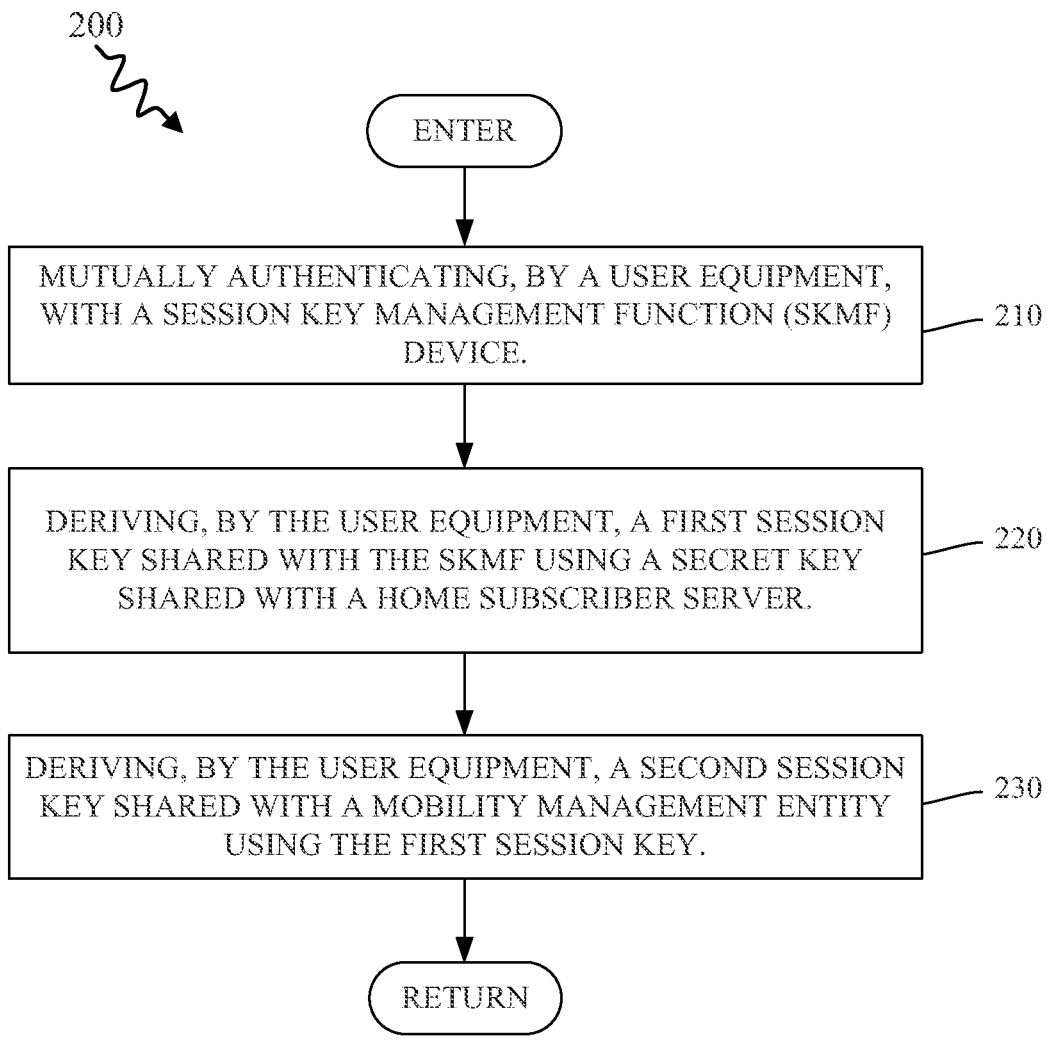
FIG. 2 is flow chart of a method for deriving digital keys for a cellular network security.
Figure 3:
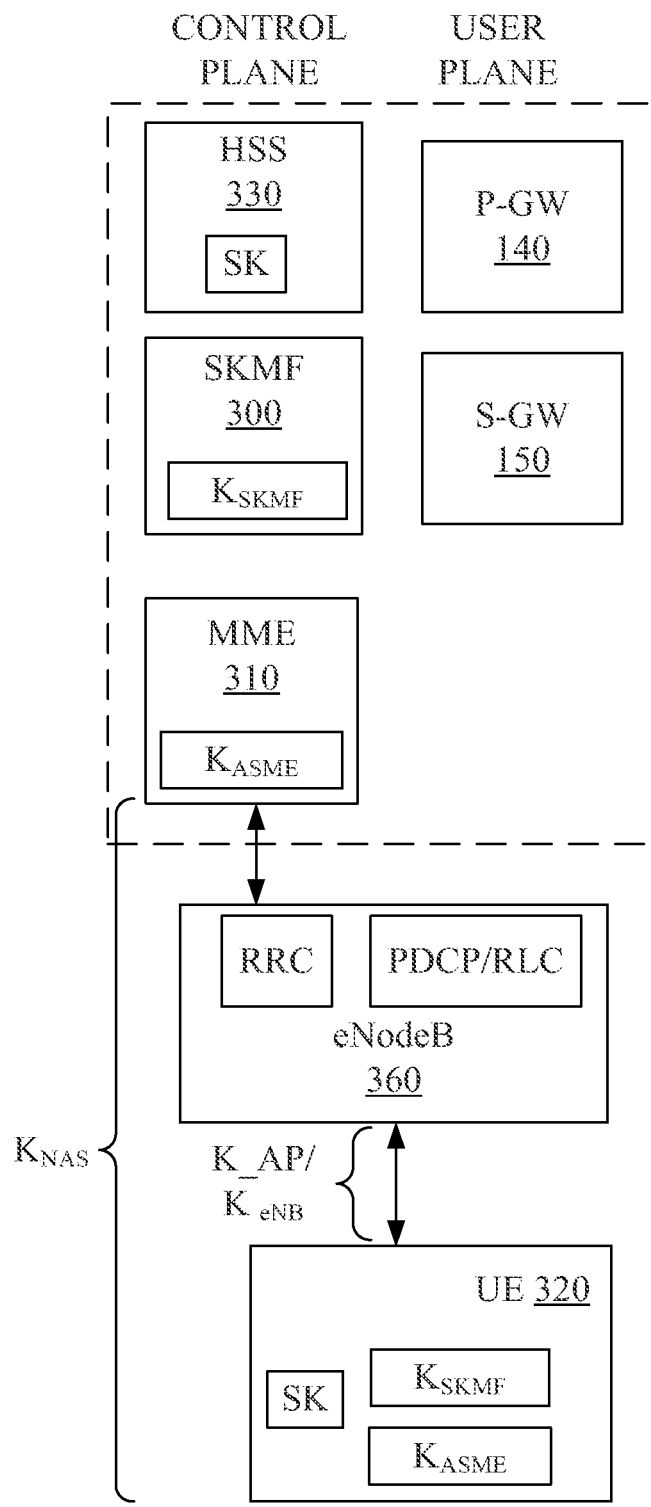
FIG. 3 is a block diagram of a first embodiment of a wireless communication system having an improved network key hierarchy.

With reference to FIGS. 2 and 3, an aspect of the present disclosure may reside in a method 200 for deriving digital keys for cellular network security. In the method, a user equipment (UE) 320 mutually authenticates with a session key management function device ("SKMF") 300 (e.g., security anchor function (SEAF)). The user equipment derives a first session key (e.g, $K_{SKMF}$) shared with the SKMF 300 using a secret key (SK) shared with a home subscriber server (HSS) 330. The user equipment then derives a second session key (e.g, $K_{ASME}$) shared with a mobility management entity (MME) 310 (e.g., access and mobility management function (AMF)) using the first session key.

In more detailed aspects of the disclosure, the SKMF (authenticator) may be a trust anchor (or key anchor) located deep inside the telecommunications network that derives a key (e.g., $K_{ASME}$) for each MME. Thus, as MMEs and/or network devices that perform their functions are pushed to the network's edge, the SKMF stays deep inside the network and is very secure. The first session key may be derived using a first key derivation function having the secret key and a serving network identity (SN_id) as inputs. The first key derivation function may be based on, e.g., HMAC-256. The mutual authentication may be performed using an extensible authentication protocol (EAP), or specific NAS signaling. The second session key may be derived during an authentication and key agreement (AKA) procedure (for the currently attached MME with the UE), or during a handover involving an MME relocation. The session may be defined for the currently attached MME by the AAA server. The MME relocation may be performed within a group of MMEs sharing an MME group identity (MMEGI). Alternatively, the MME relocation may be performed with another MME having a different MMEGI.

In other more detailed aspects of the disclosure, the second session key may be derived using a second key derivation function having the first session key and a unique globally unique MME identifier (GUMMEI) as inputs. The GUMMEI may be based on a combination of an MMEGI and an MME code. The second key derivation function may be based on HMAC-256. Alternatively, the second session key may be derived using a second key derivation function having the first session key and an MMEGI as inputs.

Another aspect of the disclosure may reside in a method for deriving a key for a user equipment 320. In the method, a network entity receives a session key (e.g, $K_{ASME}$), for the user equipment, from the SKMF 300. A communication channel for receiving the session key may be security protected. The network entity may be an eNB 360, MME, GW, etc. Alternatively, an aspect of the disclosure may reside in a method wherein the network entity may receive the session key, for the user equipment, from another network entity in a same group. In a more detailed aspect of the disclosure, a network entity may request a session key (e.g, $K_{ASME}$) from the SKMF when a source MME requests a handover without transferring a session key.

Another aspect of the disclosure, the SKMF 300 may mutually authenticate with a user equipment 320. The SKMF 300 may derive a session key (e.g, $K_{ASME}$) for use in communicating with a UE 320 connected to an MME 310. The SKMF 300 may send the session key, for the UE 320, to the MME 10. Mutually authenticating with the UE 320 may include the SKMF 300 forwarding a request to an HSS 330 for authentication information for the UE 320. The authentication information may include authentication vectors (AVs) for the UE 320. Mutually authenticating with the UE 320 may further include the SKMF 300 receiving an authentication response from the UE 320. An authentication vector may include an expected response (XRES), an authentication value (AUTN), a random number (RAND), and the first session key (e.g., $K_{SKMF}$). The AUTN may be based on a sequence number and a secret key (SK) which the UE 320 shares with the HSS 330.

The present disclosure allows network functions (e.g., the MME 310) to be moved to an edge of the network away from a network core. The SKMF 300 may be placed between the MME 310 and the HSS 330. The SKMF 300 may act a local key anchor. Accordingly, the trust required by the MME 310 may be reduced. As a result, an MME 310 for a UE 320 would not be transferred during MME relocation.

The UE may perform Authentication Key Agreement (AKA) with the SKMF. The HHS may send an AV to the SKMF. The AV may include XRES, AUTN, RAND, and $K_{SKMF}$. $K_{SKMF}$ may be derived from a shared secret key SK between the UE and the HSS. Thus, mutual authentication may be performed between the UE and the SKMF. This architecture may be used in a fifth generation (5G) cellular network.

If the AKA is successful, the SKMF sends an MME key (e.g., $K_{ASME}$) to the MME. The MME key (and other keys derived from it) may be derived according to the details provided further below.

Figure 4:
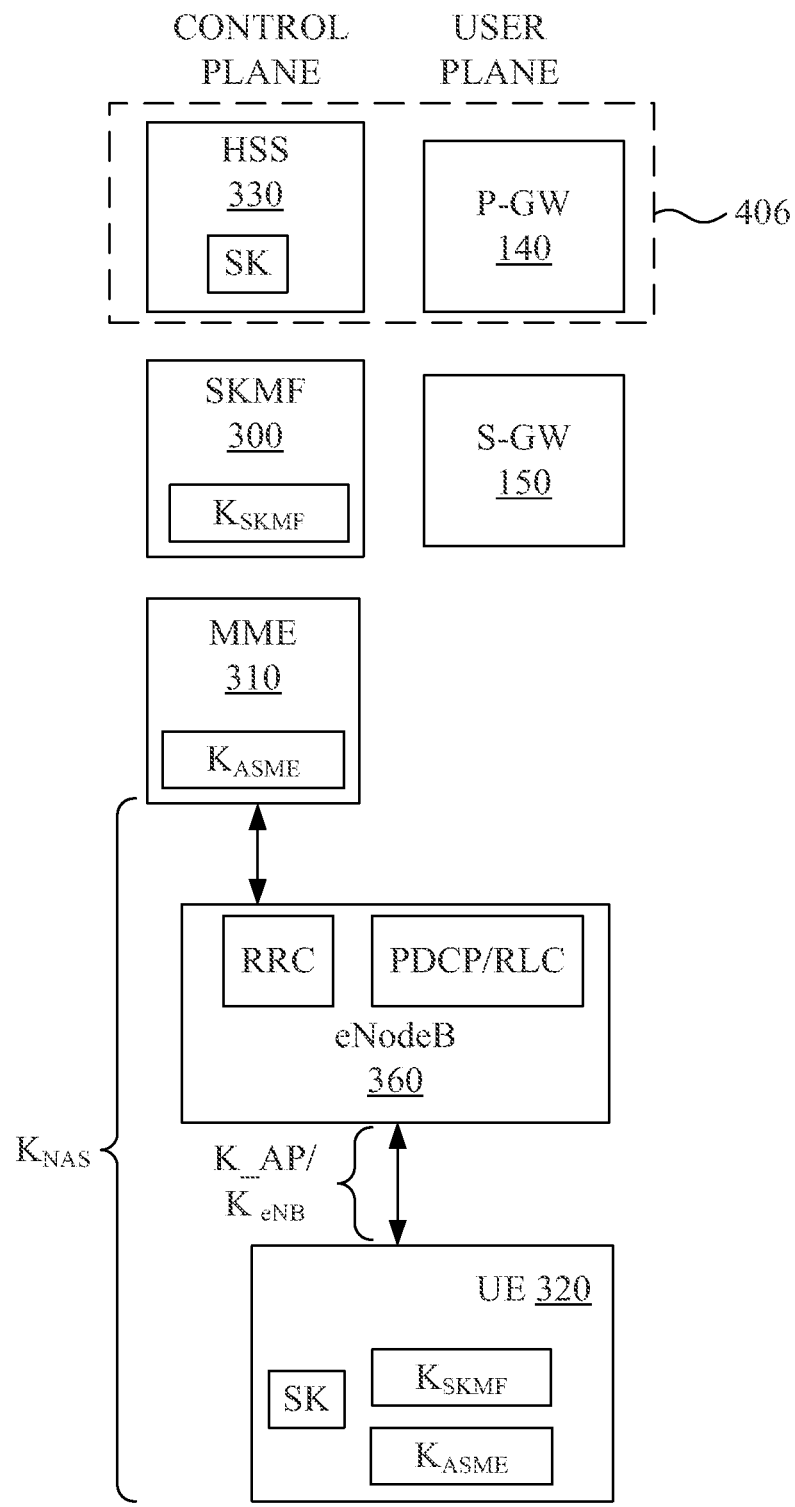
FIG. 4 is a block diagram of a second embodiment of a wireless communication system having an improved network key hierarchy.
Figure 5:
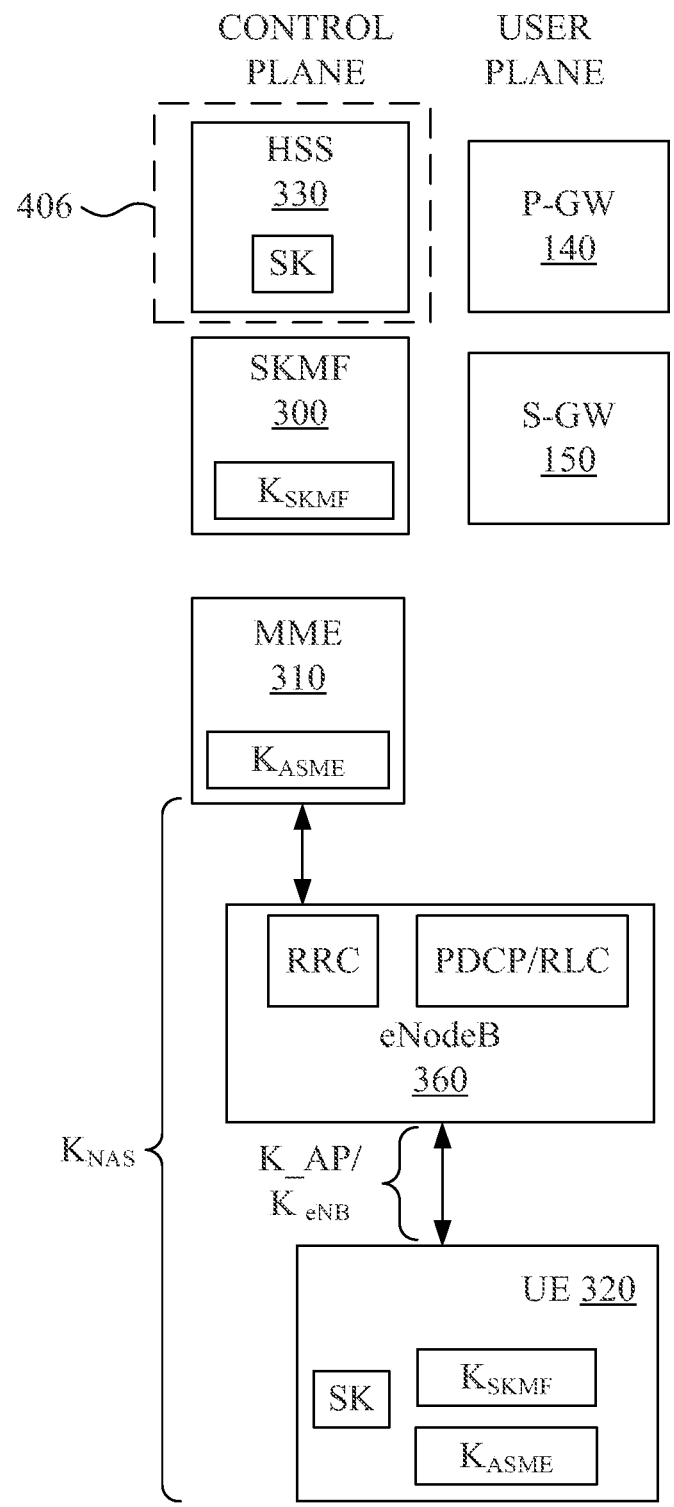
FIG. 5 is a block diagram of a third embodiment of a wireless communication system having an improved network key hierarchy.

In a roaming scenario (i.e., the UE is in a visited network), the SKMF in the visited network may become the local key anchor. Similarly, the AKA may be performed through the SKMF. As shown in FIGS. 4 and 5, an SKMF 300, which is in the visited network, and not in the home network 406, is the local key anchor. During an MME relocation (e.g., handover or tracking area update) within the local network, the SKMF derives a new $K_{ASME}$ and provides it to the target/new MME. The radio access node (RAN) session key (e.g., $K_{eNB}$) may be derived from the new $K_{ASME}$.

Figure 6:
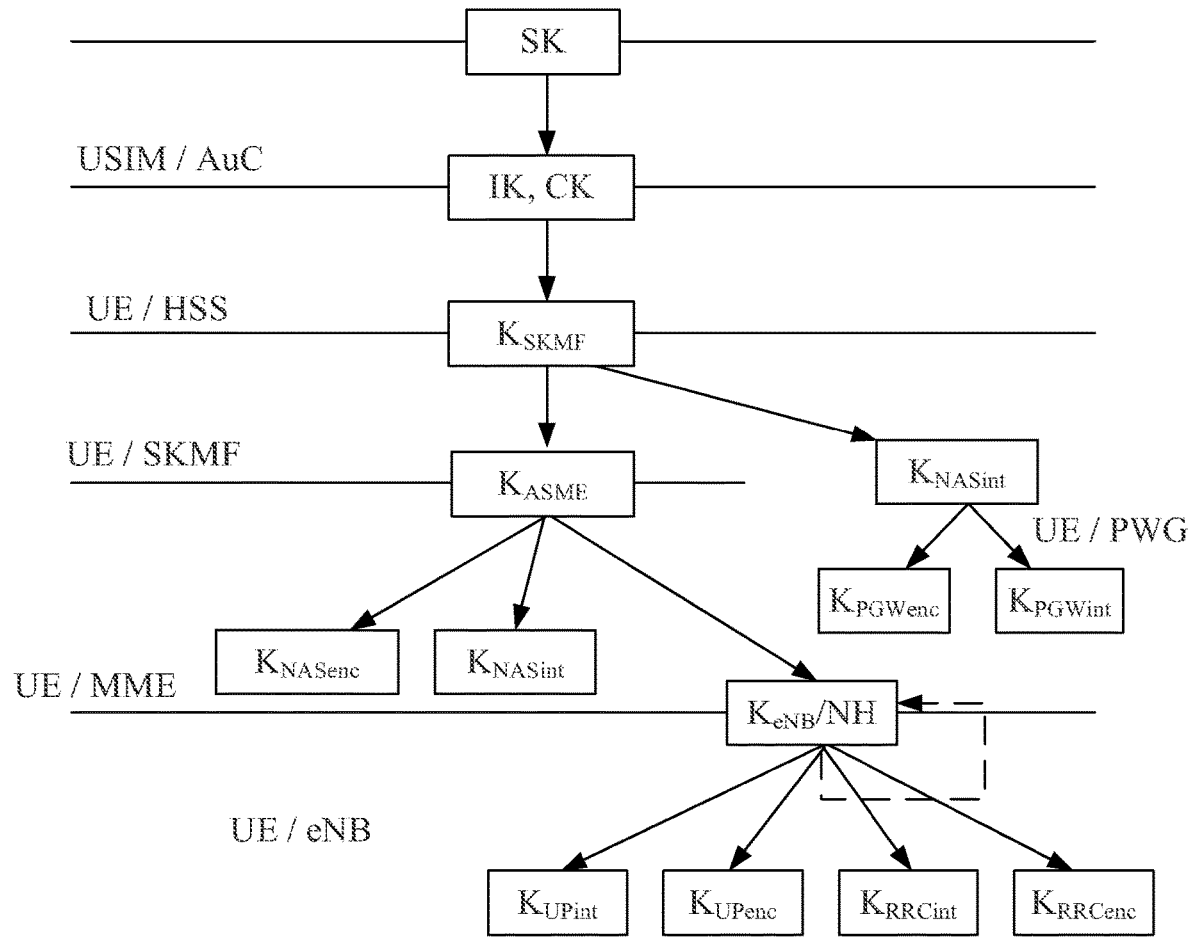
FIG. 6 is a schematic diagram of an improved key hierarchy for a cellular network.

FIG. 6 illustrates a schematic diagram of an improved key hierarchy for a cellular network. The UE's universal subscriber identity module (USIM) and the network's authentication center (AuC) store the shared secret key (SK). From the SK the integrity key (IK) and cipher key (CK) are derived and provided to the HSS. The HSS may in turn generate the first session key ($K_{SKMF}$) and provide it to the SKMF. The first session key $K_{SKMF}$ is valid during the entire authentication session. The SKMF may utilize the $K_{SKMF}$ to generate the second session key ($K_{ASME}$) and provide that key to the MME. The $K_{ASME}$ may be valid for only a specific MME. The MME may in turn generate other keys ($K_{NASenc}$, $K_{NASint}$, $K_{eNB}$/NH, etc.) based on the $K_{ASME}$.

Exemplary Attach, Handover, and Tracking Area Update (TAU) Processes

Aspects of the disclosure are descried in some parts below with respect to 4G Long Term Evolution system components. This is merely exemplary. The disclosure is not limited by any one specific network system such as 4G LTE and instead may be applied to other types of communication systems including but not limited to 5G systems.

During an initial attach to a network, a UE performs an authentication and key agreement (AKA) procedure with a session key management function (SKMF) device. Once authentication is successful, SKMF derives a key (e.g., $K_{ASME}$) for the MME to which the UE is attached and provides the key to the MME.

When a tracking area update (TAU) involving MME relocation is requested by a UE, the new MME (e.g., target MME) that receives the TAU request receives a new key $K_{ASME}$ from the SKMF and establishes a security association with the UE by performing a non-access stratum (NAS) security mode command (SMC) procedure. Similarly, when a handover involving MME relocation happens, the target MME also gets a new key $K_{ASME}$ from the SKMF and establishes a security association with the UE.

An MME that supports two tracking areas may initiate a change of $K_{ASME}$ when the UE moves between tracking areas. This hides the network configuration from UE. For example, the UEs only see tracking areas not MMEs. This may happen both in response to a TAU and a handover that changes tracking areas.

Figure 7:
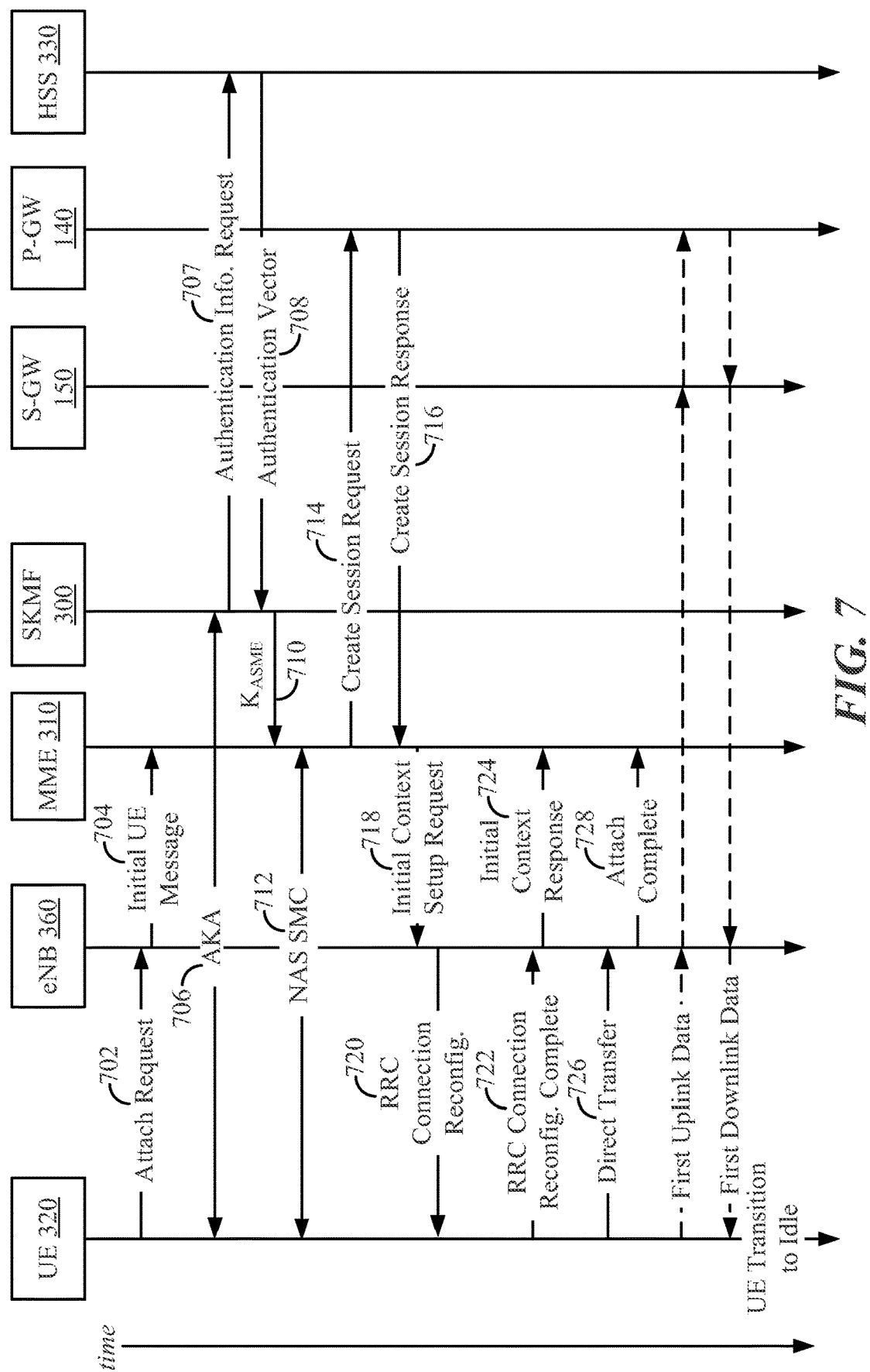
FIG. 7 illustrates a flow diagram of an attach procedure and initial data transfer for a UE connecting to a wireless communication network (e.g., wireless cellular network).

FIG. 7 illustrates a flow diagram of an attach procedure and initial data transfer for a UE connecting to a wireless communication network (e.g., wireless cellular network) according to one aspect of the disclosure. First, the UE transmits an attach request 702 to an eNB, which in turn transmits an initial UE message 704 to the MME. Next, the UE and the SKMF perform an authentication and key agreement (AKA) 706. To perform the AKA, the SKMF transmits an authentication information request 707 to the HSS and in response it receives an authentication vector 708 from the HSS that may include an expected response (XRES), an authentication value (AUTN), a random number (RAND), and an MME specific key $K_{SKMF}$. The AUTN may be based on a sequence number and a secret key (SK) which the UE shares with the HSS.

Once AKA is successful, the SKMF may derive a session key $K_{ASME}$ (e.g., "first key") based on $K_{SKMF}$ (e.g., "second key"), an MME identifier (e.g., GUMMEI), and/or a counter value (e.g., Key Count). Thus, $K_{ASME}$ may equal KDF ($K_{SKMF}$, GUMMEI∥Key Count) where KDF is a key derivation function. The counter value Key Count is a counter value that may be incremented by the SKMF to enable the SKMF to derive a fresh $K_{ASME}$ key for the same MME whenever handover back to the MME occurs. According to one aspect, a number used once (nonce) may be used instead of the counter value. According to another aspect, the GUMMEI may be omitted if it's not used to authorize a particular MME identity. For example, if SKMF is always in the same network as the MMEs it provides $K_{ASME}$ for, then including GUMMEI in the key derivation may be unnecessary. Thus, according to another example, $K_{ASME}$ may equal KDF($K_{SKMF}$, nonce). The MME specific key $K_{ASME}$ is then sent to the MME 710. The MME may then use the key $K_{ASME}$ to perform a non-access stratum (NAS) security mode command (SMC) procedure 712 with the UE. During the NAS SMC procedure 712, the MME may provide its GUMMEI and/or the Key Count to the UE so the UE can also derive $K_{ASME}$. The remaining 714-728 shown in FIG. 7 are similar to those found in 4G LTE cellular communication protocols.

Figure 8:
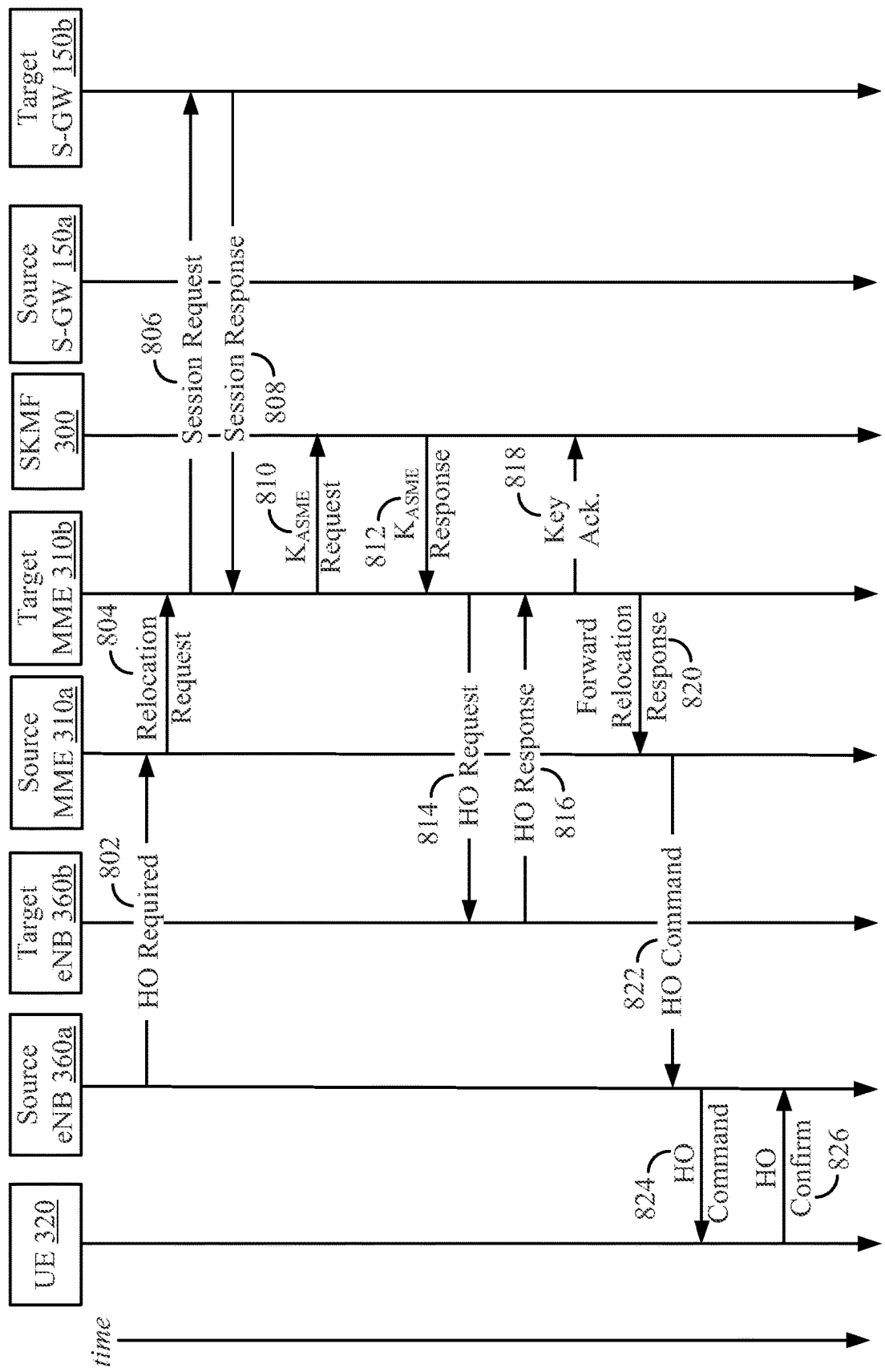
FIG. 8 illustrates a flow diagram of an S1-handover procedure.

FIG. 8 illustrates a flow diagram of an S1-handover procedure according to one aspect of the disclosure. First, the source eNB (i.e., the current eNB) transmits a handover (HO) required message 802 to the source MME (i.e., the current MME). Next, the source MME transmits/forwards a relocation request 804 to the target MME (i.e., the new MME). The target MME may create and transmit a session request 806 to a target serving gateway (S-GW) and receive a session response 808 from the target S-GW. The target MME may also transmit a key request 810 for an MME specific key $K_{ASME}$ to the SKMF. In so doing, the target MME may provide the SKMF with its GUMMEI. The SKMF may in turn generate the $K_{ASME}$ using the MME's GUMMEI, the $K_{SKMF}$ key it previously received from the HSS (described above), and the Key Count. According to one aspect, a number used once (nonce) may be used instead of the Key Count. According to another aspect, the GUMMEI may be omitted if it is not desired to authorize a particular MME identity. The SKMF transmits the $K_{ASME}$ 812 to the target MME. According to one aspect, the target MME may transmit the session request 806 to the target S-GW and transmit the key request 810 at about the same time. Thus, steps 806 and 810 may be carried out concurrently with steps 808 and 812.

The target MME may then transmit a handover request 814 to the target eNB (i.e., the potential new eNB) and in response the target eNB sends back a handover response 816. The handover request 814 may include the key $K_{eNB}$ derived by the target MME using $K_{ASME}$. The handover response 816 indicates whether the target eNB agrees to accept the handover. If the target eNB does agree to accept the handover then the target MME sends a key (i.e., $K_{ASME}$) acknowledgement message 818 to the SKMF. Upon receiving the key acknowledgement message, the SKMF may then increment the Key Count counter value. The step of sending the key acknowledgement message 818 is delayed until the handover request acknowledgement 816 is received because the handover request may be rejected by the target eNB. In such case, a new $K_{ASME}$ doesn't need to be derived by the UE, and SKMF may not need to increase the Key Count. After the target MME sends the source MME the relocation response 820, the source MME sends a handover command 822 to the source eNB which is forwarded 824 to the UE. The handover command 822, 824 may include the GUMMEI of the target MME and the Key Count so that the UE can derive the new $K_{ASME}$ and the new $K_{eNB}$ for the target eNB. The UE responds with a handover confirmation message 826 to the target eNB. The handover confirmation message 826 is integrity protected and ciphered.

Figure 9:
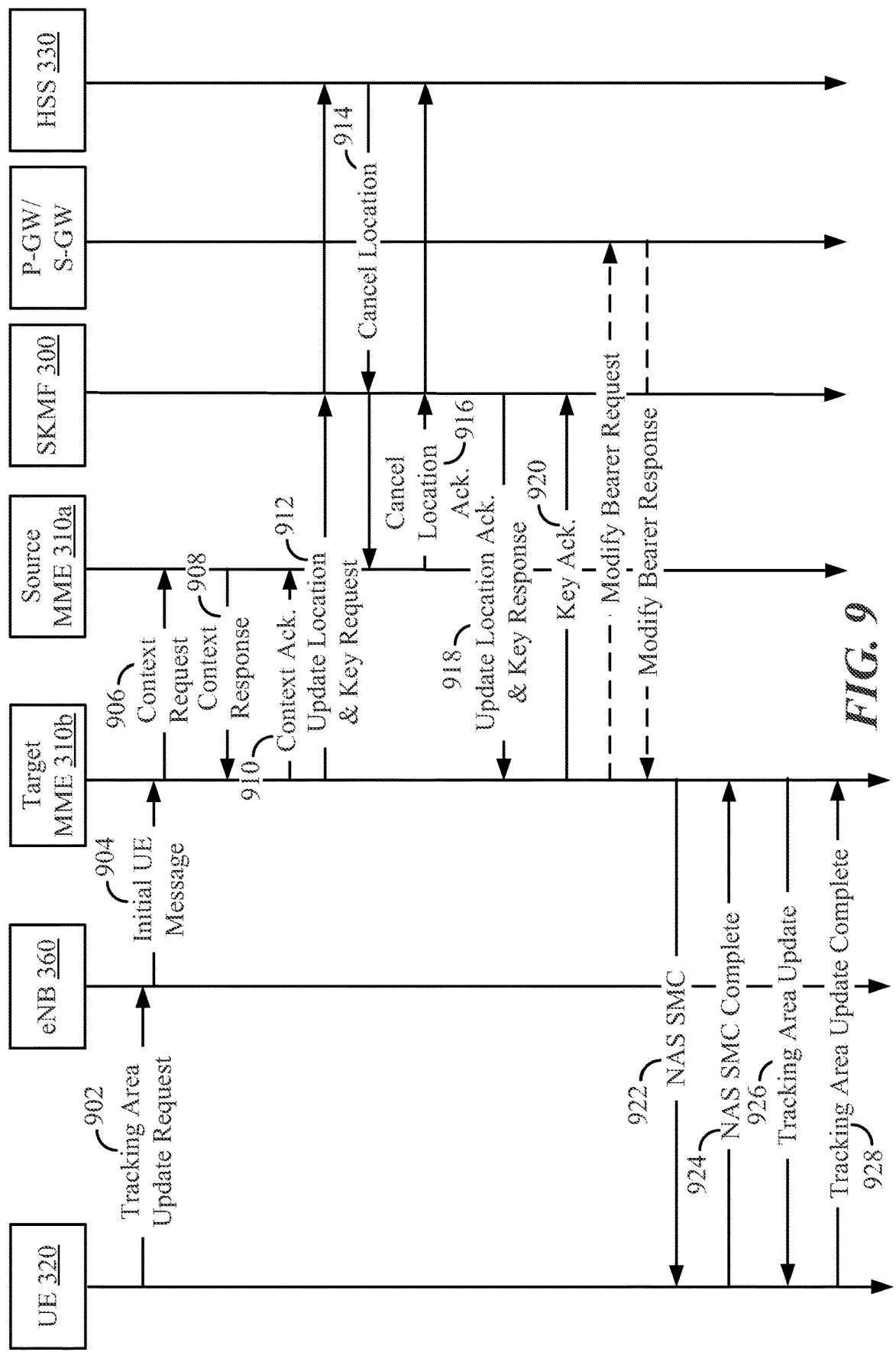
FIG. 9 illustrates a flow diagram of a tracking area update procedure after a UE moves to a new location requiring an MME relocation.

FIG. 9 illustrates a flow diagram of a tracking area update procedure after a UE moves to a new location requiring an MME relocation according to one aspect of the disclosure. First, the UE generates and transmits a tracking area update request 902 to the eNB. The eNB in turn forwards the tracking area update request 904 to a target MME that will be associated with the UE. The eNB determines which new/target MME to send the tracking area update request to based on various criteria including the location of the UE. The tracking area update request may include a globally unique temporary identifier (GUTI) which in turn includes the GUMMEI of the source MME (i.e., MME currently associated with the UE). The target MME may then use the GUMMEI in the tracking area update request it receives to transmit a UE context request message 906 to the source MME. The source MME then responds with the UE context information in a UE context response message 908. An acknowledgment 910 may be sent from the target MME to the source MME once this response is received.

The target MME may then send a location update and a key request (i.e., $K_{ASME}$ key request) to the SKMF 912. The location update is forwarded to the HSS which then sends a location cancelation message 914 to the old MME (old MME may transmit a location cancelation acknowledgement message 916 back to the HSS). The SKMF 912 may generate a new $K_{ASME}$ for the target MME based on the GUMMEI of the target MME and/or the Key Count counter value as previously described. According to one aspect, a number used once (nonce) may be used instead of the Key Count. According to another aspect, the GUMMEI may be omitted if it is not desired to authorize a particular MME identity. The new $K_{ASME}$ 918 is transmitted to the target MME along with a location update acknowledgment. Upon receiving $K_{ASME}$ from the SKMF, the target MME may reply with a key acknowledgement message 920 to the SKMF. According to one aspect, the target MME may transmit the UE context request message 906 to the source MME at about the same time it transmits the location update and key request 912 to the SKMF. Thus, steps 906, 908, and 910 may be performed concurrently with steps 914, 916, 918, 920.

Once the target MME has received the $K_{ASME}$ from the SKMF, the target MME may then perform a non-access stratum security mode command procedure 922, 924 with the UE. During the security mode command procedure the UE derives the key $K_{ASME}$ used by the target MME since the target MME provides the UE with its GUMMEI. Once the UE also has the same $K_{ASME}$ as the target MME, the UE and the target MME may engage in secure communications based on the $K_{ASME}$ key. For example, the target MME may engage in a tracking area update exchange 926, 928 with the UE whose communications are encrypted by $K_{ASME}$ or other keys (e.g., NAS encryption and integrity protection keys) derived from $K_{ASME}$. This exchange may include a message sent from the target MME to the UE that includes the new GUTI based on the target MME's GUMMEI. Such a message is again encrypted by $K_{ASME}$ or another key derived from $K_{ASME}$.

As shown in FIG. 9 and described above, the NAS SMC 922, 924 is followed by the tracking area update process 926, 928. In some aspects of the disclosure, the NAS SMC 922, 924 and the tracking area update process 926, 928 may be combined. For example, the NAS SMC message 922 sent from the target MME to the UE may be combined with the tracking area update message 926. In so doing, only part of the combined message (e.g., the part associated with the tracking area update) may be encrypted, while the portion of the message that helps the UE derive $K_{ASME}$ is left unencrypted. A new temporary mobile subscriber identity (TMSI), which is part of GUTI, allocated by the MME may be encrypted.

Key Derivation

As discussed above, AKA is run between the UE and the SKMF. The key $K_{SKMF}$ is derived by the HSS and sent to the SKMF. From the HSS' perspective, authentication vectors are constructed in the same manner as 4G LTE and sent to the SKMF instead of the MME. Thus, HSS may be connected to SKMF without any modification.

SKMF derives an MME specific key $K_{ASME}$ for a given MME and thus the MME's GUMMEI may be used in the $K_{ASME}$ key derivation process. A NAS Count value may be initialized to zero (0) for a new $K_{ASME}$. In one example, the old NAS Count values are not discarded if tracking area update(s) doesn't complete. For the freshness of the key $K_{ASME}$ the UE and the SKMF may maintain a Key Count counter value and use it for $K_{ASME}$ derivation. This may be done to avoid deriving the same $K_{ASME}$ in cases where the UE moves back to an old MME (e.g., source MME). The Key Count counter value may be initialized to zero (0) or some other pre-determined value when the initial AKA is performed successfully. In some aspect, a nonce may be used instead of the Key Count counter value. In another aspect, the GUMMEI may be omitted from the key derivation.

The key derivation function (KDF) used to generate the keys $K_{SKMF}$, $K_{ASME}$, $K_{eNB}$, next hop (NH), etc. may utilize HMAC-SHA-256, HMAC-SHA-3, etc. The input string S may be constructed from n+1 input parameters. For example, $S=[FC\|P_0\|L_0\|P_1\|L_1\|P_2\|L_2\| \ldots \|P_N\|L_N]$. The field code FC may be a single octet used to distinguish between different instances of the algorithm and may use a value in the range 0x50-0x5F. The input parameters $P_0$ through $P_N$ are the n+1 input parameter encodings. $P_0$ may be a static ASCII-encoded string. The values $L_0$ through $L_N$ are two octet representations of the length of the corresponding input parameters $P_0$ through $P_N$.

$K_{SKMF}$ Derivation.

$K_{SKMF}=KDF(K_{CK/IK}, S)$. The input S may be equal to $[FC\|P_0\|L_0\|P_1\|L_1]$ where FC=0x50, $P_0$=SN id, $L_0$=length of SN id (i.e., $L_0$=0x00 0x03), $P_1$=SQN XOR AK, and $L_1$=length of $P_1$ (i.e., $L_1$=0x00 0x06). SQN is the sequence number and AK is anonymity key, and XOR is the exclusive OR operation. The value SQN XOR AK is sent to the UE as part of the authentication token (AUTN). If AK is not used then AK may be treated in accordance with TS 33.102 (i.e., 000 . . . 0). The input key $K_{CK/IK}$ is the concatenation of the cipher key (CK) and the integrity key (IK), i.e., $K_{CK/IK}=CK\|IK$.

$K_{ASME}$ Derivation.

$K_{ASME}=KDF(K_{SKMF}, S)$. The input S may be equal to $[FC\|P_0\|L_0\|P_1\|L_1]$ where FC=0x51, $P_0$=GUMMEI, $L_0$=length of 48 bit GUMMEI (i.e., $L_0$=0x00 0x06), $P_1$=Key Count, and $L_1$ may equal the length of $P_1$ (e.g., $L_1$=0x00 0x08). This is merely one example of how $K_{ASME}$ may be derived. In another aspects, the GUMMEI may be omitted and rand number used once (e.g., nonce) may be used instead of the Key Count counter value.

NH Derivation.

$NH=KDF(K_{ASME}, S)$. The input S may be equal to $[FC\|P_0\|L_0]$ where FC=0x52, $P_0$=Sync-Input, $L_0$=length of Sync-Input (i.e., $L_0$=0x00 0x20). The Sync-Input parameter may be newly derived $K_{eNB}$ for the initial NH derivation, and the previous NH for all subsequent derivations. This results in an NH chain, where the next NH is always fresh and derived from the previous NH.

$K_{eNB}$ Derivation.

$K'_{eNB}=KDF(K_x, S)$. When deriving $K'_{eNB}$ from the current $K_{eNB}$ or from a fresh NH and the target physical cell identifier in the UE and the eNB as specified in clause 7.2.8 for handover purposes, the input S may be equal to $[FC\|P_0\|L_0\|P_1\|L_1]$ where FC=0x53, $P_0$=target physical cell identifier (PCI), $L_0$=length of PCI (e.g., $L_0$=0x00 0x02), $P_1$=EARFCN-DL (target physical cell downlink frequency), and $L_1$=length of $P_1$ (e.g., $L_1$=0x00 0x02). The input key $K_x$ may be the 256 bit next hop (NH) key when the index in the handover increases otherwise the current 256 bit $K_{eNB}$ is used.

FIGS. 7-9 shown and described above assume that the MMEs change from source to target MME. However, the same process flow diagrams may be used when a single MME assumes the role of two MMEs (source MME and target MME) and there is no actual interface between the two MMEs.

In the above description with regards to FIGS. 7-9 and key derivation, specific non-exclusive, non-limiting examples of network components and related terminology was used to demonstrate aspects of the disclosure of the present application. For example, the "user equipment" may be just one example of a device. The MMEs may be just one example of control plane devices. The SMKF may be just one example of a key management device. The MME identifier (e.g., GUMMEI) may be just one example of a control plane device identifier. The tracking area may be just one example of a service area, and similarly, the tracking area update may be just one example a service area update. The SMC and NAS SMC may be just some examples of control plane messages. The eNB may be just one example of a radio access node.

Figure 10:
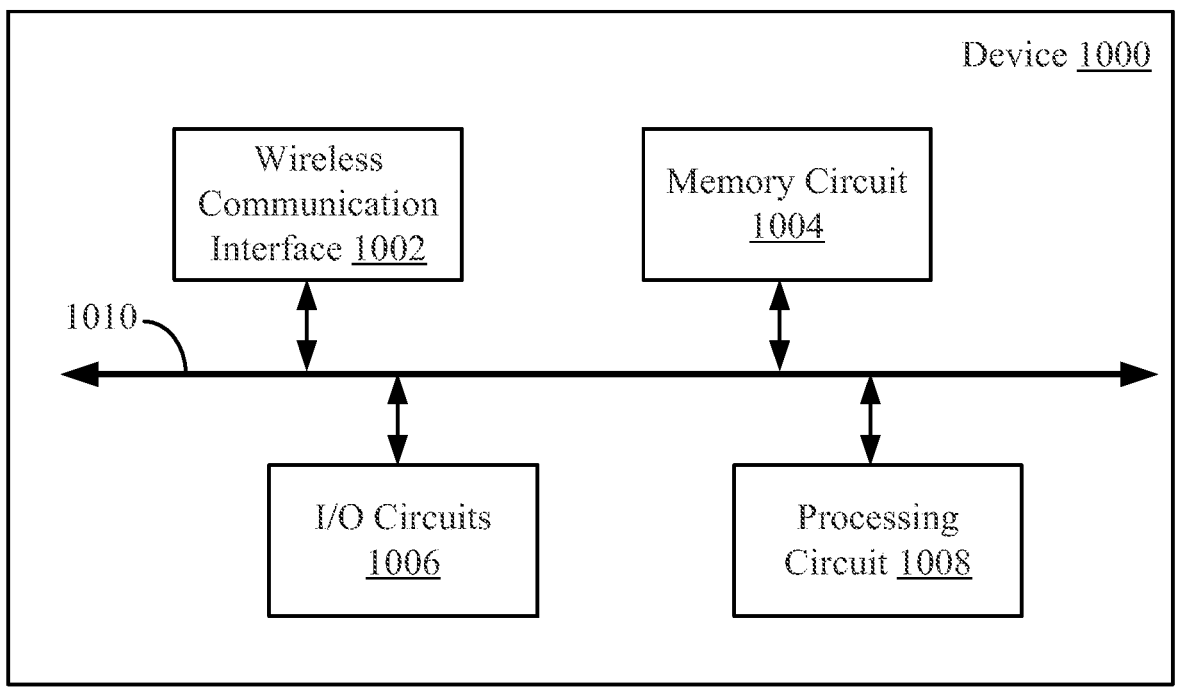
FIG. 10 illustrates a first exemplary schematic block diagram of a device such as a user device/equipment.

FIG. 10 illustrates a schematic block diagram of a device 1000 (e.g., "user device", "user equipment", "wireless device", etc.) according to one aspect of the disclosure. The user device 1000 may be any wireless communication device such as, but not limited to, a mobile phone, a smartphone, a laptop, a personal digital assistant (PDA), a tablet, a computer, a smartwatch, and a head-mounted wearable computer (e.g., Google Glass®). The user device 1000 may include at least one or more wireless communication interfaces 1002, one or more memory circuits 1004, one or more input and/or output (I/O) devices/circuits 1006, and/or one or more processing circuits 1008 that may be communicatively coupled to one another. For example, the interface 1002, the memory circuit 1004, the I/O devices 1006, and the processing circuit 1008 may be communicatively coupled to each other through a bus 1010. The wireless communication interface 1002 allows the user device 1000 to communicate wirelessly with the wireless communication network 104. Thus, the interface 1002 allows the user device 1000 to communicate wirelessly with wireless wide area networks (WWAN), such as mobile telecommunication cellular networks, as well as short range, wireless local area networks (e.g., WiFi®, Zigbee®, Bluetooth®, etc.).

The memory circuit 1004 may include one or more volatile memory circuits and/or non-volatile memory circuits. Thus, the memory circuit 1004 may include dynamic random access memory (DRAM), static random access memory (SRAM), magnetoresistive random access memory (MRAM), electrically erasable programmable read-only memory (EEPROM), flash memory, etc. The memory circuit 1004 may store one or more cryptographic keys. The memory circuit 1004 may also store instructions that may be executed by the processing circuit 1008. The I/O devices/circuits 1006 may include one or more keyboards, mice, displays, touchscreen displays, printers, fingerprint scanners, and any other input and/or output devices.

The processing circuit 1008 (e.g., processor, central processing unit (CPU), application processing unit (APU), etc.) may execute instructions stored at the memory circuit 1006 and/or instructions stored at another computer-readable storage medium (e.g., hard disk drive, optical disk drive, solid-state drive, etc.) communicatively coupled to the user device 1000. The processing circuit 1008 may perform any one of the steps and/or processes of the user device 1000 described herein including those discussed with reference to FIGS. 2, 3, 4, 5, 6, 7, 8, 9, 11, and 12.

Figure 11:
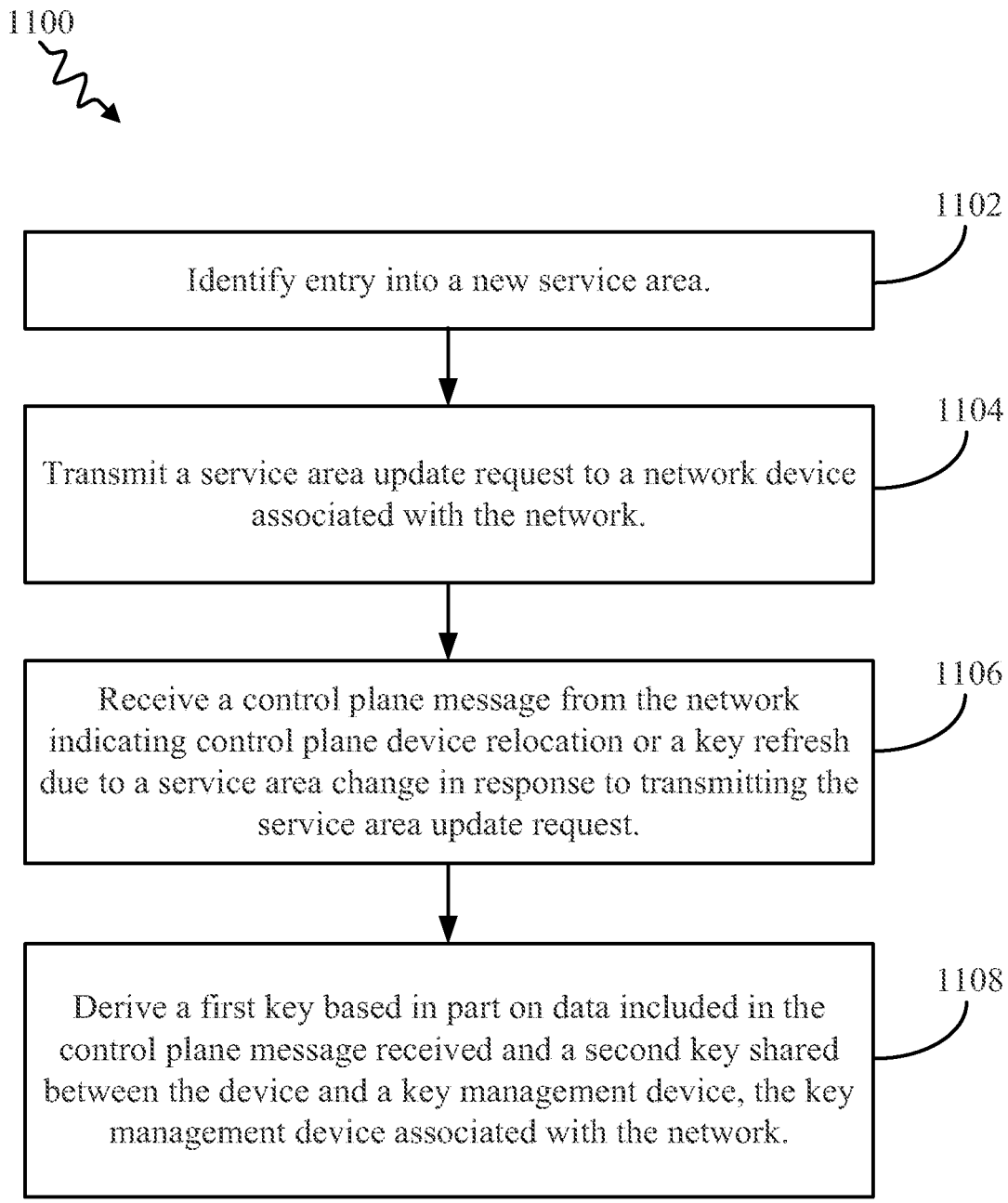
FIG. 11 illustrates a first exemplary method operational at a device for performing service area updates involving control plane device relocation or a change of service area.

FIG. 11 illustrates a method 1100 operational at a device. The device may be an integrated circuit, a plurality of integrated circuits, or an electronic device that incorporates one or more integrated circuits. The method may be for performing service area updates involving control plane device relocation or a change of service area. First, entry into a new service area (e.g., new tracking area, new routing area, etc.) is identified 1102 at the device. Next, a service area update request is transmitted 1104 to a network device associated with a network. Then, a control plane message (one non-limiting, non-exclusive example includes a security mode command) is received 1106 from the network indicating control plane device relocation or a key refresh due to a service area change in response to transmitting the service area update request. Next, a first key (e.g., $K_{ASME}$) is derived 1108 based in part on data included in the control plane message received and a second key (e.g., $K_{SKMF}$) shared between the device and a key management device (e.g., SKMF), where the key management device is associated with the network. According to one aspect, the control plane message is received from a target control plane device (e.g., target MME) due to the service area change, the target control plane device being a different control plane device (e.g., source MME) from one currently serving the device. According to another aspect, the data included in the control plane message includes a control plane device identifier (e.g., MME identifier such as but not limited to GUMMEI) that identifies a control plane device that is and/or will be serving the device.

According to one aspect, deriving the first key is further based in part on a counter value Key Count maintained at the key management device and is included in the control plane message. According to another aspect, at least one of an evolved node B (eNB) key $K_{eNB}$, a non-access stratum key $K_{NAS}$, and/or a next hop (NH) key is derived based on the first key to secure communications between the device and the network. According to yet another aspect, the new service area is at least one of a new tracking area and/or a new routing area, and the service area update request is associated with at least one of a tracking area update and/or a routing area update.

According to one aspect, the control plane message is a security mode command, the target control plane device is a target MME, the key management device is an SKMF device, and the second key is a session root key (e.g., anchor key $K_{SEAF}$) for an authentication session. According to another aspect, a control plane device maintains a mobility management context and a session management context for the device, and the key management device maintains the second key.

Figure 12:
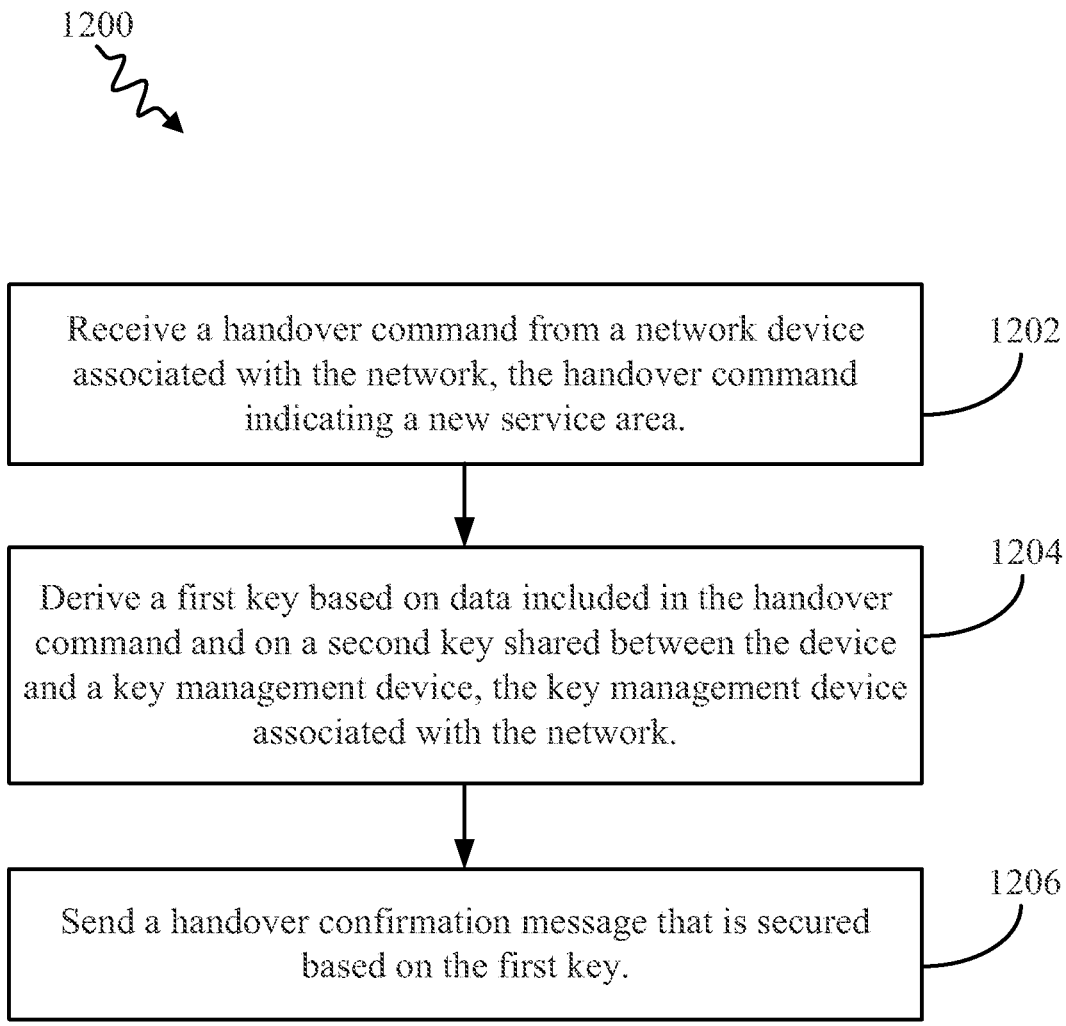
FIG. 12 illustrates a second exemplary method operational at a device for performing handover involving control plane device relocation or a change of service area.

FIG. 12 illustrates a method 1200 operational at a device for performing handover involving control plane device relocation or a change of service area. First, a handover command is received 1202 from a network device (e.g., source eNB) associated with the network, where the handover command indicates a new service area (e.g., new tracking area, new routing area, etc.). Next, a first key (e.g., $K_{ASME}$) is derived 1204 based on data included in the handover command and on a second key (e.g., $K_{SKMF}$) shared between the device and a key management device (e.g., SKMF), where the key management device is associated with the network. Then, a handover confirmation message that is secured based on the first key is sent 1206 to the network device.

According to one aspect, the handover command includes a target control plane device identifier (e.g., target MME identifier that may include GUMMEI) associated with a target control plane device (e.g., target MME) serving a target radio access node (e.g., target eNB) that is and/or will be serving the device. According to another aspect, deriving the first key is based in part on the target control plane device identifier. According to yet another aspect, the target control plane device is a target mobility management entity (MME), the key management device is a session key management function (SKMF) device, and the target control plane device identifier is an MME identifier associated with the target MME.

Figure 13:
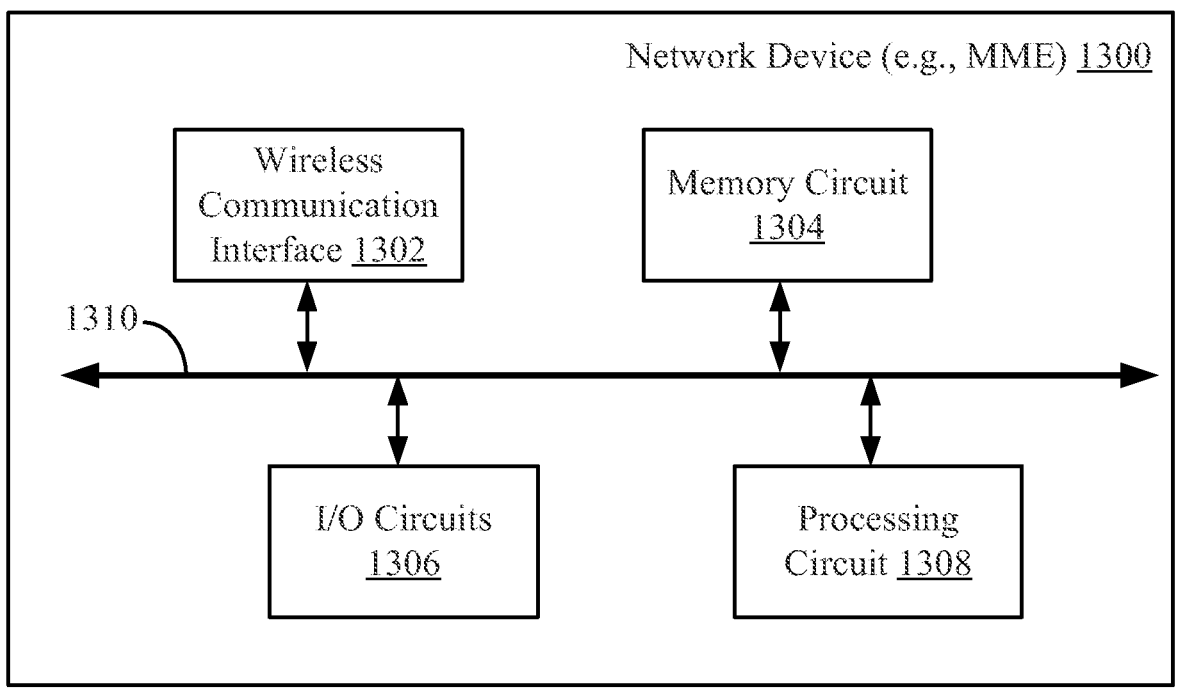
FIG. 13 illustrates a first exemplary schematic block diagram of a network device such as an MME.

FIG. 13 illustrates a schematic block diagram of a network device 1300 according to one aspect of the disclosure. The network device 1300 may be an MME, a RAN, S-GW, and/or P-GW. The network device 1300 may include at least one or more wireless communication interfaces 1302, one or more memory circuits 1304, one or more input and/or output (I/O) devices/circuits 1306, and/or one or more processing circuits 1308 that may be communicatively coupled to one another. For example, the interface 1302, the memory circuit 1304, the I/O devices 1306, and the processing circuit 1308 may be communicatively coupled to each other through a bus 1310. The wireless communication interface 1302 allows the network device 1300 to communicate wirelessly with the user device 102. Thus, the interface 1302 allows the network device 1300 to communicate wirelessly through wireless wide area networks (WWAN), such as mobile telecommunication cellular networks, and/or short range, wireless local area networks (e.g., WiFi®, Zigbee®, Bluetooth®, etc.).

The memory circuit 1304 may include one or more volatile memory circuits and/or non-volatile memory circuits. Thus, the memory circuit 1304 may include DRAM, SRAM, MRAM, EEPROM, flash memory, etc. The memory circuit 1304 may store one or more cryptographic keys. The memory circuit 1304 may also store instructions that may be executed by the processing circuit 1308. The I/O devices/circuits 1306 may include one or more keyboards, mice, displays, touchscreen displays, printers, fingerprint scanners, and any other input and/or output devices.

The processing circuit 1308 (e.g., processor, central processing unit (CPU), application processing unit (APU), etc.) may execute instructions stored at the memory circuit 1306 and/or instructions stored at another computer-readable storage medium (e.g., hard disk drive, optical disk drive, solid-state drive, etc.) communicatively coupled to the network device 1300. The processing circuit 1308 may perform any one of the steps and/or processes of a network devices described herein including those discussed with reference to FIGS. 2, 3, 4, 5, 6, 7, 8, 9, 14, and 15.

Figure 14:
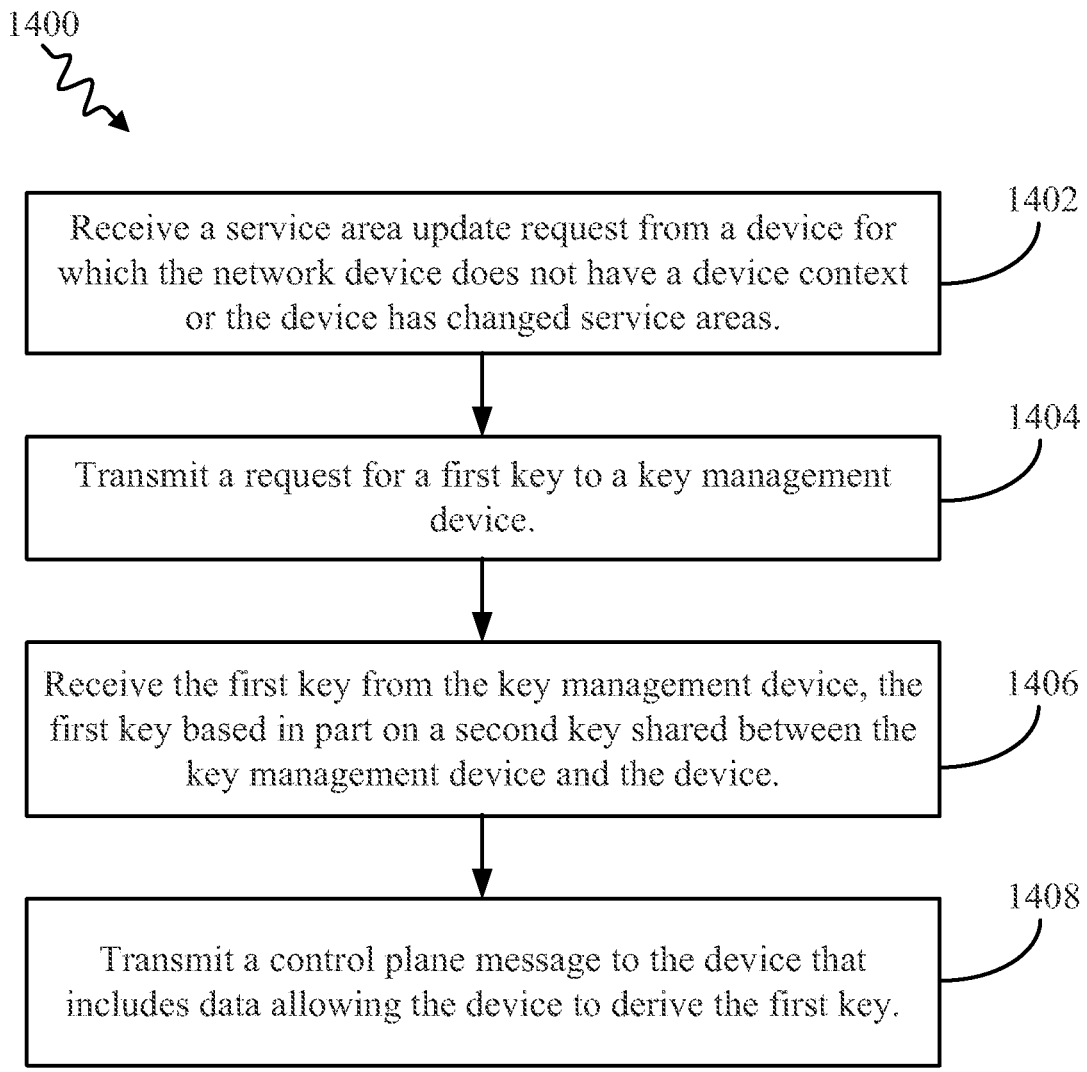
FIG. 14 illustrates a first exemplary method operational at a network device for performing a service area update involving control plane device relocation or a change of service area at the control plane device.

FIG. 14 illustrates a method 1400 operational at a network device for performing a tracking area update involving control plane device relocation or a change of service area at the control plane device. First, a service area update request is received 1402 from a device (e.g., user equipment) for which the network device does not have a device context (e.g., UE context) or the device has changed service areas (e.g., tracking areas or routing areas). Next, a request for a first key (e.g., $K_{ASME}$) is transmitted 1404 to a key management device (e.g., SKMF). Then, the first key is received 1406 from the key management device, where the first key based in part on a second key (e.g., $K_{SKMF}$) shared between the key management device and the device. Next, a control plane message is transmitted 1408 to the device that includes data allowing the device to derive the first key. According to one aspect, the network device is a mobility management entity (MME) and the first key is further based on an MME identifier that identifies the MME. According to another aspect, a device context request is transmitted to a prior control plane device that previously served the device if the network device does not have the device context.

According to one aspect, the device context is received from the prior control plane device in response to transmitting the device context request. According to another aspect, the data includes a control plane device identifier that identifies the network device. According to yet another aspect, a counter value Key Count is received from the key management device along with the first key.

According to one aspect, the counter value Key Count is included in the data transmitted to the device. According to another aspect, a service area update is transmitted to the device after receiving notification from the device that the control plane message was successfully received. According to yet another aspect, the service area update request is associated with at least one of a tracking area update and/or a routing area update and changing service areas includes at least one of changing tracking areas and/or changing routing areas. According to another aspect, the control plane message is a non-access stratum security mode command, the key management device is a session key management function (SKMF) device, the device is a user equipment, the device context is a user equipment context associated with the user equipment, and the second key is a session root key (e.g., anchor key $K_{SEAF}$) for an authentication session.

Figure 15:
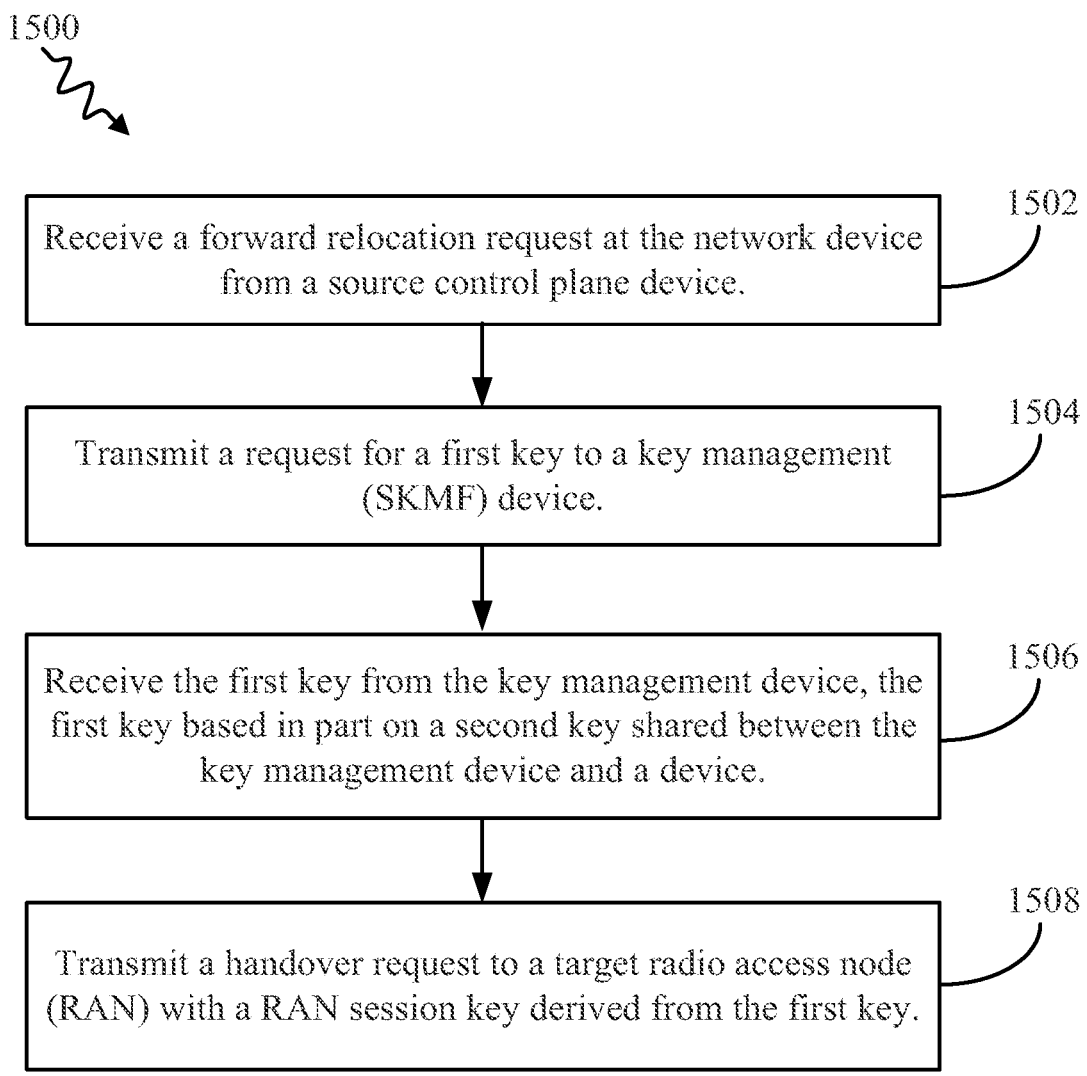
FIG. 15 illustrates a second exemplary method operational at a network device for performing handover involving control plane device relocation or a change of service area at the control plane device.

FIG. 15 illustrates a method 1500 operational at a network device for performing handover involving a control plane device relocation or a change of service area at the control plane device. First, a forward relocation request is received 1502 at the network device from a source control plane device. Next, a request for a first key is transmitted 1504 to a key management (SKMF) device. Then, the first key is received 1506 from the key management device, where the first key is based in part on a second key shared between the key management device and a device. Next, a handover request is transmitted to a target radio access node (RAN) with a RAN session key (e.g., RAN key) derived from the first key. According to one aspect, a handover request acknowledgement message is received from the target RAN indicating the target RAN will serve the device. According to another aspect, an acknowledgement message is transmitted to the key management device indicating receipt of the first key only after receiving the handover request acknowledgement message from the target RAN.

According to one aspect, a forward relocation response is transmitted to the source control plane device that includes data utilized by the device to derive the first key. According to another aspect, the network device is a target control plane device that will serve the device and the data includes a target control plane device identifier that identifies the target control plane device. According to yet another aspect, the target control plane device is a target mobility management entity (MME), the source control plane device is a source MME, the target control plane device identifier is a globally unique MME identifier (GUMMEI), the key management device is a session key management function (SKMF) device, and the device is a user equipment. According to yet another aspect, a counter value Key Count is received along with the first key.

Figure 16:
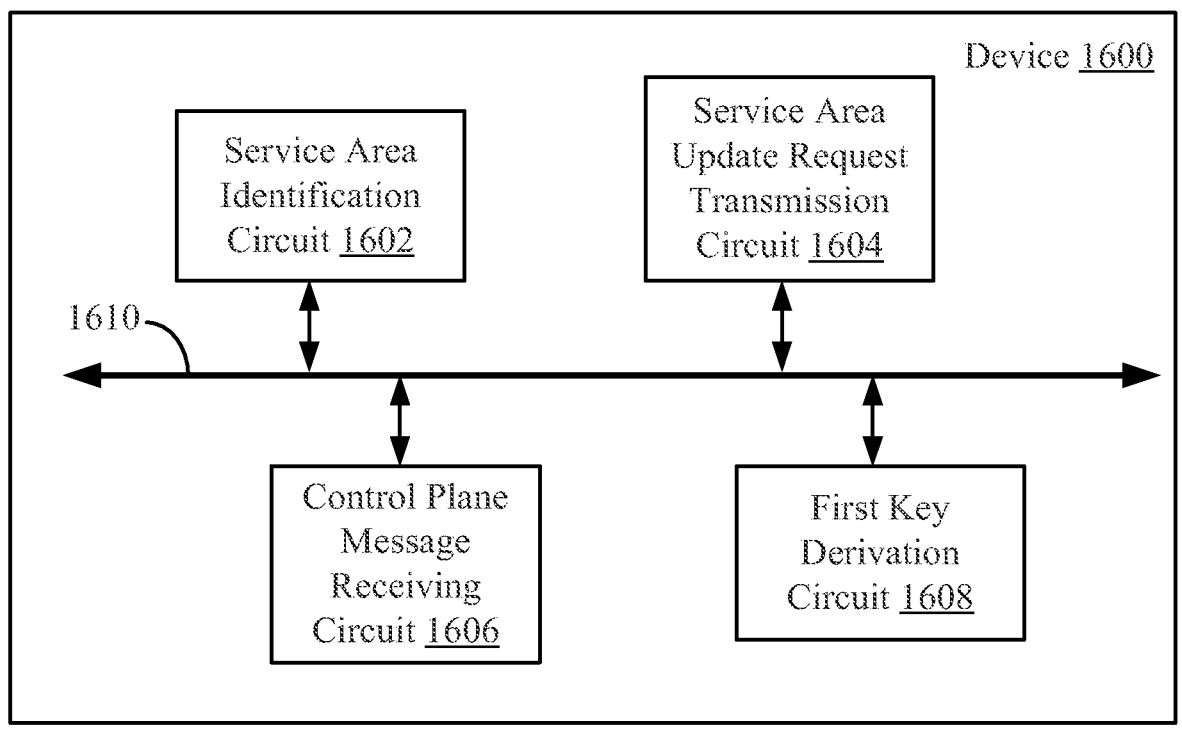
FIG. 16 illustrates a second exemplary schematic block diagram of a device such as a user device/equipment.

FIG. 16 illustrates a block diagram of a device 1600 (e.g., user device/equipment) according to one aspect of the disclosure. The device 1600 may include a service area identification circuit 1602, a service area update request transmission circuit 1604, a control plane message receiving circuit 1606, and/or a first key derivation circuit 1608, which may all be communicatively coupled via a communication bus 1610. Each of the circuits 1602, 1604, 1606, 1608 of the device 1600 may be specialized circuits (e.g., application specific integrated circuits (ASICs), field programmable gate arrays (FPGAs), etc.) that are specifically wired to perform their respective specific functions.

The service area identification circuit 1602 may be one example of a means for identifying entry into a new service area. The service area update request transmission circuit 1604 may be one example of a means for transmitting a service area update request to a network device associated with the network. The control plane message receiving circuit 1606 may be one example of a means for receiving a control plane message from the network indicating control plane device relocation or a key refresh due to a service area change in response to transmitting the service area update request. The first key derivation circuit 1608 may be one example of a means for deriving a first key based in part on data included in the control plane message received and a second key shared between the device and a key management device.

Figure 17:
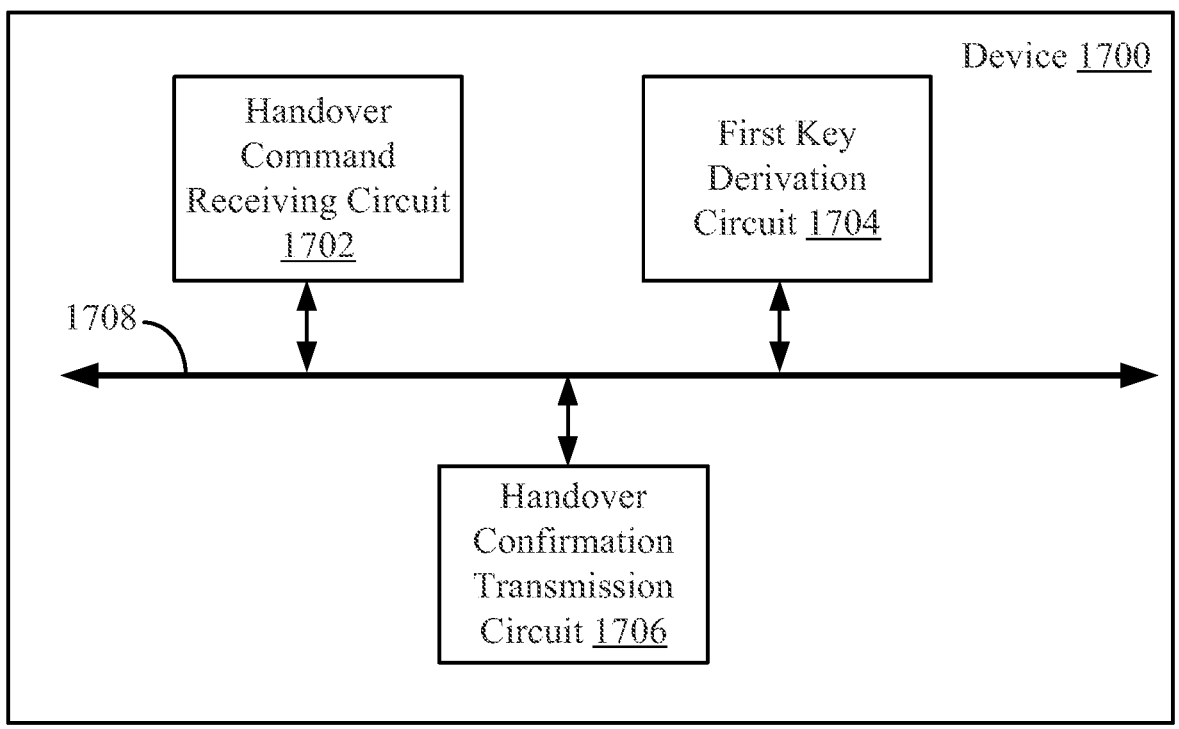
FIG. 17 illustrates a third exemplary schematic block diagram of a device such as a user device/equipment.

FIG. 17 illustrates a block diagram of a device 1700 (e.g., user device/equipment) according to one aspect of the disclosure. The device 1700 may include a handover command receiving circuit 1702, a first key derivation circuit 1704, and/or a handover confirmation transmission circuit 1706, which may all be communicatively coupled via a communication bus 1708. Each of the circuits 1702, 1704, 1706 of the device 1700 may be specialized circuits (e.g., ASICs, FPGAs, etc.) that are specifically wired to perform their respective specific functions.

The handover command receiving circuit 1702 may be one example of a means for receiving a handover command from a network device associated with the network, the handover command indicating a new service area. The first key derivation circuit 1704 may be one example of a means for deriving a first key based on data included in the handover command and on a second key shared between the device and a key management device. The handover confirmation transmission circuit 1706 may be one example of a means for sending a handover confirmation message that is secured based on the first key.

Figure 18:
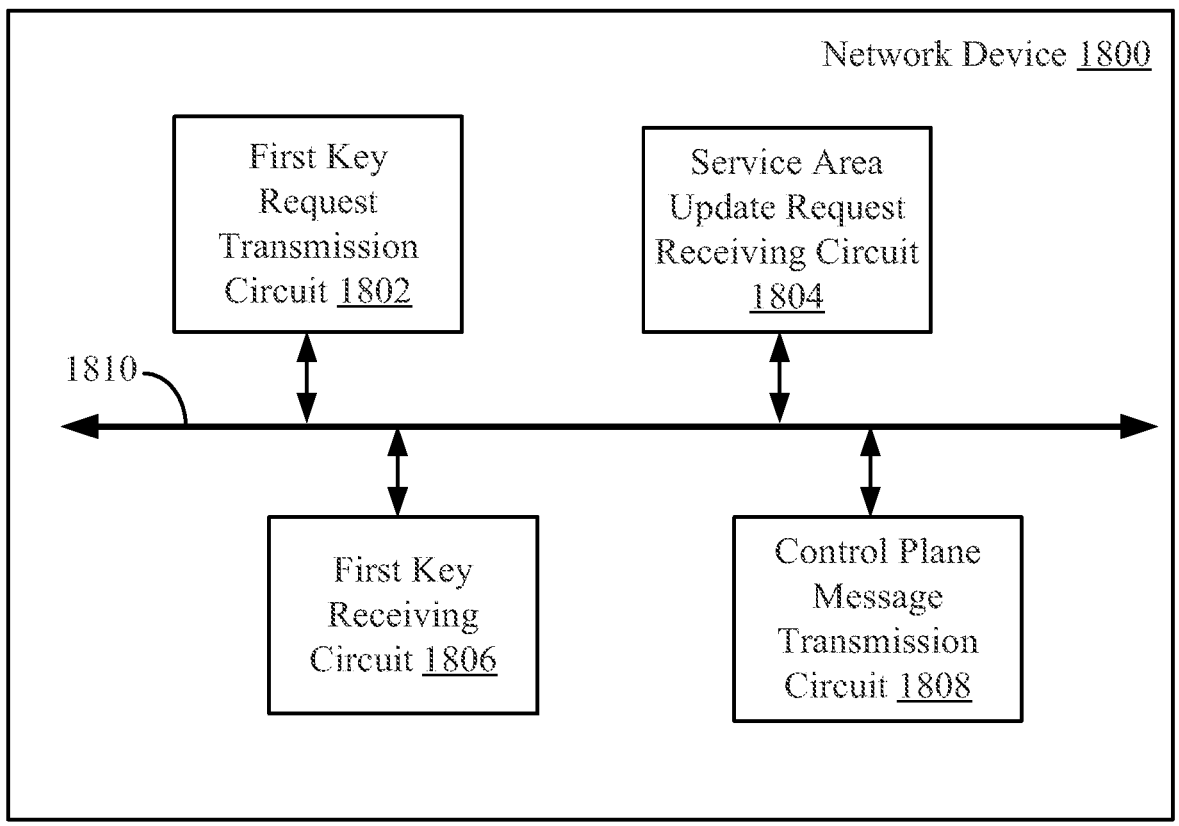
FIG. 18 illustrates a second exemplary schematic block diagram of a network device such as an MME.

FIG. 18 illustrates a block diagram of a network device 1800 (e.g., MME) according to one aspect of the disclosure. The device 1800 may include a first key request transmission circuit 1802, a service area update request receiving circuit 1804, a first key receiving circuit 1806, and/or control plane message transmission circuit 1808, which may all be communicatively coupled via a communication bus 1810. Each of the circuits 1802, 1804, 1806, 1808 of the network device 1800 may be specialized circuits (e.g., ASICs, FPGAs, etc.) that are specifically wired to perform their respective specific functions.

The first key request transmission circuit 1802 may be one example of a means for transmitting a request for a first key to a key management device. The service area update request receiving circuit 1804 may be one example of a means for receiving a service area update request from a device for which the network device does not have a device context or the device has changed service areas. The first key receiving circuit 1806 may be one example of a means for receiving the first key from the key management device, the first key based in part on a second key shared between the key management device and the device. The control plane message transmission circuit 1808 may be one example of a means for transmitting a control plane message to the device that includes data allowing the device to derive the first key.

Figure 19:
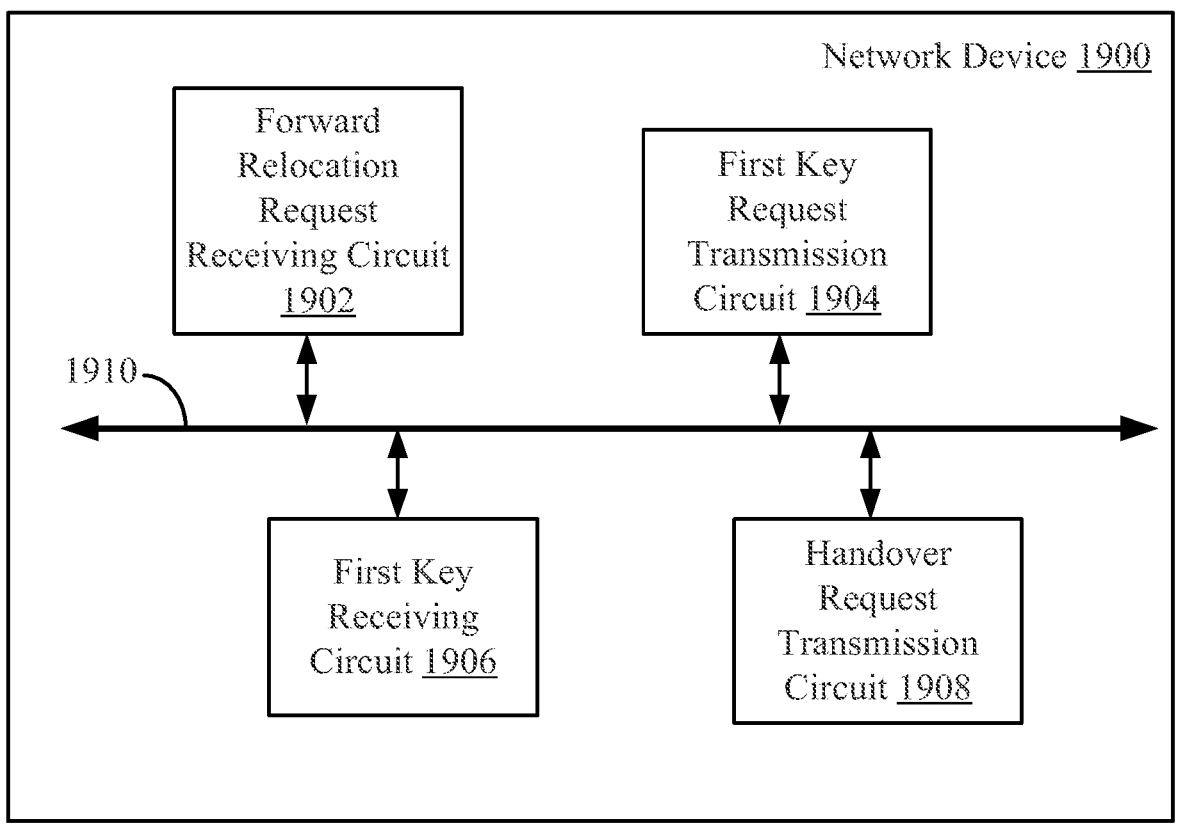
FIG. 19 illustrates a third exemplary schematic block diagram of a network device such as an MME.

FIG. 19 illustrates a block diagram of a network device 1900 (e.g., MME) according to one aspect of the disclosure.

The device 1900 may include a forward relocation request receiving circuit 1902, a first key request transmission circuit 1904, a first key receiving circuit 1906, and/or a handover request transmission circuit 1908, which may all be communicatively coupled via a communication bus 1910. Each of the circuits 1902, 1904, 1906, 1908 of the network device 1900 may be specialized circuits (e.g., ASICs, FPGAs, etc.) that are specifically wired to perform their respective specific functions.

The forward relocation request receiving circuit 1902 may be one example of a means for receiving a forward relocation request at the network device from a source control plane device. The first key request transmission circuit 1904 may be one example of a means for transmitting a request for a first key to a key management device. The first key receiving circuit 1906 may be one example of a means for receiving the first key from the key management device, the first key based in part on a second key shared between the key management device and a device. The handover request transmission circuit 1908 may be one example of a means for transmitting a handover request to a target radio access node (RAN) with a RAN session key derived from the first key.

One or more of the components, steps, features, and/or functions illustrated in FIGS. 2, 3, 4, 5, 6, 7, 8, 9, 10, 11, 12, 13, 14, 15, 16, 17, 18, and/or 19 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 3, 4, 5, 7, 8, 9, 10, 13, 16, 17, 18, and/or 19 may be configured to perform one or more of the methods, features, or steps described in FIGS. 2, 6, 7, 8, 9, 11, 12, 14, and/or 15. The algorithms described herein may also be efficiently implemented in software and/or embedded in hardware.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A user equipment (UE) for use in wireless communication, the UE comprising:
    a wireless communication interface configured to transmit and receive data wirelessly to a network; and
    a processing circuit communicatively coupled to the wireless communication interface, the processing circuit configured to:
        receive a handover command from a first network apparatus of a current service area for a handover of the UE from the first network apparatus to a second network apparatus of a new service area, the first network apparatus implementing a mobility management function associated with the network, the handover command received from the first network apparatus through a source access node of the current service area, the handover command indicating the new service area and identifying the second network apparatus, the second network apparatus implementing a mobility management function associated with the new service area;
        derive a first key based on data included in the handover command and on a second key shared between the UE and a key management device that is separate from the first network apparatus and the second network apparatus, the key management device associated with the network, wherein the first key is based on a device identifier within the data that identifies the second network apparatus; and
        send a handover confirmation message that is secured based on the first key, the handover confirmation message confirming the handover from the first network apparatus of the current service area to the second network apparatus of the new service area.

2. The UE of claim 1, wherein the second network apparatus is a target control plane device and the handover command is configured to include a target control plane device identifier associated with the target control plane device.

3. The UE of claim 2, wherein the processing circuit is further configured to derive the first key based in part on the target control plane device identifier.

4. The UE of claim 2, wherein the target control plane device is a target mobility management entity (MME), the key management device is a session key management function (SKMF) device, and the target control plane device identifier is configured as an MME identifier associated with the target MME.

5. The UE of claim 1, wherein the processing circuit is further configured to derive the first key based in part on a counter value obtained from the data of the handover command.

6. The UE of claim 1, wherein the second key is configured as a session root key for an authentication session.

7. The UE of claim 1, wherein the processing circuit is further configured to derive the first key based in part on a nonce obtained from the data of the handover command.

8. The UE of claim 1, wherein the processing circuit is further configured to derive a third key based on the first key and the data of the handover command, the third key configured for securing communications between the UE and a target access node.

9. A method operational at a UE for use in wireless communications, the method comprising:
receiving a handover command from a first network apparatus of a current service area for a handover of the UE from the first network apparatus to a second network apparatus of a new service area, the first network apparatus implementing a mobility management function associated with a network, the handover command received from the first network apparatus through a source access node of the current service area, the handover command indicating the new service area and identifying the second network apparatus, the second network apparatus implementing a mobility management function associated with the new service area;
deriving a first key based on data included in the handover command and on a second key shared between the UE and a key management device that is separate from the first network apparatus and the second network apparatus, the key management device associated with the network, wherein the first key is based on a device identifier within the data that identifies the second network apparatus; and
sending a handover confirmation message that is secured based on the first key, the handover confirmation message confirming the handover from the first network apparatus of the current service area to the second network apparatus of the new service area.

10. The method of claim 9, wherein the second network apparatus is a target control plane device and the handover command includes a target control plane device identifier associated with the target control plane device.

11. The method of claim 10, wherein deriving the first key is based in part on the target control plane device identifier.

12. The method of claim 9, wherein deriving the first key is further based in part on a counter value obtained from the data of the handover command the data.

13. The method of claim 9, wherein the second key is a session root key for an authentication session.

14. The method of claim 9, wherein deriving the first key is based in part on a nonce obtained from the data of the handover command.

15. The method of claim 9, further comprising deriving a third key based on the first key and the data of the handover command and securing communications between the UE and a target access node using the third key.

16. An apparatus for wireless communication comprising:
means for receiving a handover command at a user equipment (UE) from a first network apparatus of a current service area for a handover of the UE from the first network apparatus to a second network apparatus of a new service area, the first network apparatus implementing a mobility management function associated with a network, the handover command received from the first network apparatus through a source access node of the current service area, the handover command indicating the new service area and identifying the second network apparatus, the second network apparatus implementing a mobility management function associated with the new service area;
means for deriving a first key at the UE based on data included in the handover command and on a second key shared between the UE and a key management device that is separate from the first network apparatus and the second network apparatus, the key management device associated with the network, wherein the first key is based on a device identifier within the data that identifies the second network apparatus; and
means for sending a handover confirmation message from the UE that is secured based on the first key, the handover confirmation message confirming the handover from the first network apparatus of the current service area to the second network apparatus of the new service area.

17. The apparatus of claim 16, wherein the second network apparatus is a target control plane device and the means for receiving a handover command comprises means for receiving a target control plane device identifier associated with the target control plane device.

18. The apparatus of claim 17, wherein the means for deriving the first key comprises means for deriving the first key based in part on the target control plane device identifier.

19. The apparatus of claim 16, wherein the means for deriving the first key further comprises means for deriving the first key based in part on a counter value obtained from the data of the handover command.

20. The apparatus of claim 16, wherein the second key is a session root key for an authentication session.

21. A processor-readable storage medium having one or more instructions which when executed by at least one processing circuit of a user equipment (UE) causes the at least one processing circuit to:
receive a handover command from a first network apparatus of a current service area for a handover of the UE from the first network apparatus to a second network apparatus of a new service area, the first network apparatus implementing a mobility management function associated with a network, the handover command received from the first network apparatus through a source access node of a current service area, the handover command indicating a new service area and identifying a second network apparatus, the second network apparatus implementing a mobility management function associated with the new service area;
derive a first key based on data included in the handover command and on a second key shared between the UE and a key management device that is separate from the first network apparatus and the second network apparatus, the key management device associated with the network, wherein the first key is based on a device identifier within the data that identifies the second network apparatus; and
send a handover confirmation message that is secured based on the first key, the handover confirmation message confirming the handover from the first network apparatus of the current service area to the second network apparatus of the new service area.

22. The processor-readable storage medium of claim 21, wherein the second network apparatus is a target control plane device and the handover command includes a target control plane device identifier associated with the target control plane device.

23. The processor-readable storage medium of claim 22, wherein the one or more instructions include instructions for deriving the first key based in part on the target control plane device identifier.

24. The processor-readable storage medium of claim 21, wherein the one or more instructions include instructions for deriving the first key based in part on a counter value obtained from within the data of the handover command.

* * * * *